US008905343B2

(12) United States Patent
Gaudreault et al.

(10) Patent No.: US 8,905,343 B2
(45) Date of Patent: Dec. 9, 2014

(54) APPARATUS AND METHOD FOR BRUSH CUTTING AND BALING WOOD CHIPS FORMED DURING LAND CLEARING ACTIVITIES

(75) Inventors: Daniel Gaudreault, Summerville, SC (US); Etienne Labbe, Sainte-Marie (CA)

(73) Assignee: GYRO-TRAC Corporation, Summerville, SC (US)

( * ) Notice: Subject to any disclaimer, the term of this patent is extended or adjusted under 35 U.S.C. 154(b) by 613 days.

(21) Appl. No.: 13/120,289

(22) PCT Filed: Sep. 23, 2009

(86) PCT No.: PCT/CA2009/001350

§ 371 (c)(1),
(2), (4) Date: Jun. 1, 2011

(87) PCT Pub. No.: WO2010/034116

PCT Pub. Date: Apr. 1, 2010

(65) Prior Publication Data

US 2011/0290921 A1 Dec. 1, 2011

Related U.S. Application Data

(60) Provisional application No. 61/136,654, filed on Sep. 23, 2008.

(51) Int. Cl.
*B02C 21/02* (2006.01)
*A01F 15/07* (2006.01)

(Continued)

(52) U.S. Cl.
CPC .............. *A01G 23/093* (2013.01); *A01F 15/07* (2013.01); *A01D 34/835* (2013.01);

(Continued)

(58) Field of Classification Search
CPC ............................ B02C 2201/066; A01G 3/08
USPC ............................. 241/101.71–101.77, 101.2
See application file for complete search history.

(56) References Cited

U.S. PATENT DOCUMENTS 4,140,281 A 2/1979 Fulghum et al.
4,232,719 A * 11/1980 Payton ......................... 144/34.1

(Continued)

FOREIGN PATENT DOCUMENTS

CA 2018335 12/1990
CA 2546294 11/2007

(Continued)

OTHER PUBLICATIONS

International Search Report and Written Opinion for related application PCT/US2010/059697.

*Primary Examiner* — Mark Rosenbaum
(74) *Attorney, Agent, or Firm* — Beck & Tysver PLLC

(57) ABSTRACT

The present invention relates generally to brush cutters and baling machines and methods of operation therefor, and more specifically, to an apparatus and a method for brush cutting and baling wood chips formed during land clearing activities. The apparatus includes a vehicle having front and rear ends. A brush cutter is carried at the front end of the vehicle. The brush cutter has a housing and a brush cutting head mounted for rotation within the housing. The brush cutting head has a support body and a plurality of cutting teeth mounted thereon. The cutting teeth are capable of reducing brush to wood chips and cutting debris when the brush cutting head is actuated. The brush cutting head is operable to take up at least some of the wood chips and cutting debris into the brush cutter housing while the cutting teeth are reducing brush to wood chips and cutting debris. The apparatus is further provided with a bale forming apparatus coupled for towage to the rear end of the vehicle. The bale forming apparatus is operable to form bales of wood chips. A plurality of conveyor assemblies is carried on the brush cutting and bale forming apparatus for transporting the wood chips from the brush cutter housing to the bale forming apparatus.

29 Claims, 22 Drawing Sheets

(51) Int. Cl.

| | |
|---|---|
| ***A01D 34/835*** | (2006.01) |
| ***A01D 43/08*** | (2006.01) |
| ***A01G 23/093*** | (2006.01) |
| ***A01F 15/10*** | (2006.01) |

(52) U.S. Cl.
CPC ........... *A01D 43/08* (2013.01); *A01F 2015/078* (2013.01); *A01F 15/106* (2013.01)
USPC ................................. 241/101.2; 241/101.742

(56) References Cited

U.S. PATENT DOCUMENTS

| | | | | |
|---|---|---|---|---|
| 4,767,067 A * | 8/1988 | Bruer et al. | ..................... | 241/81 |
| 5,052,170 A | 10/1991 | Trenkamp et al. | | |
| 5,205,496 A | 4/1993 | O'Donnell et al. | | |
| 5,661,961 A | 9/1997 | Westhoff et al. | | |

FOREIGN PATENT DOCUMENTS

| | | |
|---|---|---|
| EP | 1090543 | 4/2001 |
| EP | 1842417 | 10/2007 |
| JP | 2003000049 | 1/2003 |

* cited by examiner

APPARATUS AND METHOD FOR BRUSH CUTTING AND BALING WOOD CHIPS FORMED DURING LAND CLEARING ACTIVITIES

FIELD OF THE INVENTION

The present invention relates generally to brush cutters and baling machines and methods of operation therefor, and more specifically, to an apparatus and a method for brush cutting and baling wood chips formed during land clearing activities.

BACKGROUND OF THE INVENTION

Land clearing (i.e. felling and mulching) operations are often performed with a heavy-duty brush cutter mounted to the front of a work vehicle. A typical brush cutter includes a brush cutting head provided with an elongate support body that carries about its outer surface a plurality of teeth adapted to cut trees, brush or the like. The cutting teeth are typically fixed to the outer surface of the drum via mounting blocks. As the support body rotates at high speed, the cutting edge of tooth comes into contact with the brush thereby creating debris as a result of the cutting action of the tooth. The resulting debris is comprised of wood chips, vegetative detritus, small rocks and dirt. Typically, following the land clearing activities, this debris is left on the ground where it will eventually (at least partially) decompose. While this may enrich the soil, it tends not to be a very efficient use of natural resources given that no effort is made to recover and use the wood chips which (while actually quite versatile) tend to be regarded as a waste by-product of land clearing activities.

In light of the foregoing, it would be advantageous to have an apparatus and method which would allow wood chips to be relatively easily, recovered, collected, stored and transported for use so as to minimize wastage of such wood chips and enhance utilization of natural resources.

SUMMARY OF THE INVENTION

In accordance with one embodiment of the present invention, there is provided a brush cutting and bale forming apparatus. The apparatus includes a vehicle having front and rear ends. A brush cutter is carried at the front end of the vehicle. The brush cutter has a housing and a brush cutting head mounted for rotation within the housing. The brush cutting head has a support body and a plurality of cutting teeth mounted thereon. The cutting teeth are capable of reducing brush to wood chips and cutting debris when the brush cutting head is actuated. The brush cutting head is operable to take up at least some of the wood chips and cutting debris into the brush cutter housing while the cutting teeth are reducing brush to wood chips and cutting debris. The apparatus is further provided with a bale forming apparatus coupled for towage to the rear end of the vehicle. The bale forming apparatus is operable to form bales of wood chips. A plurality of conveyor assemblies is carried on the brush cutting and bale forming apparatus for transporting the wood chips from the brush cutter housing to the bale forming apparatus.

In an additional feature, the housing has an interior space defined therein. A portion of the housing defines a well for receiving the brush cutting head and the interior space of the housing communicates with the well to permit the travel of wood chips from the well into the interior space of the housing. Moreover, the housing includes first and second spaced apart side panels, a curved wall extending longitudinally between the first and second side panels and joined thereto and an elongate cover panel placed over the curved wall in spaced relation thereto. The curved wall corresponds substantially to the portion of the housing defining the well. The interior space is defined between the curved wall and the cover panel. The curved wall has an elongate opening defined therein which forms a passage between the well and the interior space through which wood chips may travel.

In a further feature, the well has first and second ends. The plurality of conveyor assemblies includes a first conveyor assembly disposed within the interior space of the housing and extending generally parallel to the well. The first conveyor assembly is operable to transport wood chips from the first end of the well toward the second end thereof. The first conveyor assembly may be selected from the group consisting of a belt conveyor assembly and a screw conveyor assembly.

In another feature, the plurality of conveyor assemblies includes a second conveyor assembly disposed transverse of the first conveyor assembly and adjacent the second end of the well. The second conveyor assembly is configured to receive wood chips from the first conveyor assembly and to carry the wood chips rearwardly toward the bale forming apparatus. Optionally, each of the first and second conveyor assemblies may be a belt conveyor assembly. In such case, a portion of the second conveyor assembly is located directly beneath the discharge end of the first conveyor assembly so as to allow wood chips from the first conveyor assembly to be deposited onto the second conveyor assembly. As another option, the discharge end of the first conveyor assembly is operatively connected to the second conveyor assembly to allow wood chips from the first conveyor assembly to be introduced into the second conveyor assembly and each of the first and second conveyor assemblies is a screw conveyor assembly. As a further option, the first conveyor assembly may be a screw conveyor assembly and the second conveyor assembly may be a blower.

In still another feature, the plurality of conveyor assemblies includes a third conveyor assembly disposed rearward of the second conveyor assembly. The third conveyor assembly is configured to receive wood chips from the second conveyor assembly and to carry the wood chips rearward toward the bale forming apparatus. A chute is positioned beneath the discharge end of the second conveyor assembly to receive wood chips therefrom. The chute is connected to the third conveyor assembly and is capable of directing wood chips received from the discharge end of the second conveyor assembly to the third conveyor assembly. Optionally, each of the second and third conveyor assemblies may be a belt conveyor assembly. As another option, each of the second and third conveyor assemblies may be a screw conveyor assembly. As a further option, the second conveyor assembly may be a blower and the third conveyor assembly may be a screw conveyor assembly.

In yet another additional feature, the plurality of conveyor assemblies includes a fourth conveyor assembly disposed rearward of the third conveyor assembly. The fourth conveyor assembly is configured to receive wood chips from the third conveyor assembly and to carry the wood chips rearward toward the bale forming apparatus. The fourth conveyor assembly is a screw conveyor assembly. Optionally, the fourth conveyor assembly may be supported on the vehicle. Alternatively, it may be supported on the housing of the bale forming apparatus.

In a further feature, the apparatus is provided with a grinding assembly for grinding the wood chips prior to their being introduced into the bale forming apparatus. The grinding assembly is positioned to receive wood chips from the fourth conveyor assembly and to discharge ground wood chips into the bale forming apparatus.

In still another feature, the bale forming apparatus has a housing defined by a front panel, a rear panel, a top panel, a bottom panel and a pair of sidewalls extending between the front and rear panels and between the top and bottom panels. In one option, the top panel has an aperture through which the wood chips may be introduced into the bale forming apparatus. In another option, the front panel has an aperture through which the wood chips may be introduced into the bale forming apparatus.

In an additional feature, the bale forming apparatus has a housing defined by a front panel, a rear panel, a top panel, a bottom panel and a pair of sidewalls extending between the front and rear panels and between the top and bottom panels, a compaction chamber contained within the housing and baling mechanism disposed within the compaction chamber. In one option, the baling mechanism includes a plurality of chain and slat conveyor assemblies operable to act upon the wood chips to form a bale. In another option, the baling mechanism includes a plurality of chain and belt conveyor assemblies operable to act upon the wood chips to form a bale.

In accordance with one embodiment of the present invention, there is provided a brush cutting and bale forming apparatus. The apparatus includes a vehicle having front and rear ends. A brush cutter is carried at the front end of the vehicle. The brush cutter has a housing and a brush cutting head mounted for rotation within the housing. The brush cutting head has a support body and a plurality of cutting teeth mounted thereon. The cutting teeth are capable of reducing brush to wood chips and cutting debris when the brush cutting head is actuated. The brush cutting head is operable to take up at least some of the wood chips and cutting debris while the cutting teeth are reducing brush to wood chips and cutting debris. The apparatus is further provided with a bale forming apparatus coupled for towage to the rear end of the vehicle. The bale forming apparatus is operable to form bales of wood chips. A plurality of conveyor assemblies is carried on the brush cutting and bale forming apparatus for transporting the wood chips from the brush cutting head to the bale forming apparatus.

In accordance with yet another embodiment of the present invention, there is provided a method for reducing brush to wood chips and cutting debris and baling the wood chips. The method included the step of providing a vehicle having front and rear ends. Also provided, is a brush cutter carried at the front end of the vehicle. The rush cutter has a housing and a brush cutting head mounted for rotation within the housing. The brush cutting head has a support body and a plurality of cutting teeth mounted thereon. The cutting teeth are capable of reducing brush to wood chips and cutting debris when the brush cutting head is actuated. A bale forming apparatus is attached at the rear end of the vehicle. The bale forming apparatus is operable to form bales of wood chips. The method further includes the step of passing the vehicle over the ground to be cleared of brush and actuating the brush cutting head so as to urge the cutting teeth to reduce the brush to wood chips and cutting debris. The wood chips and cutting debris are taken up from the ground into the brush cutter housing while the cutting teeth are reducing the brush to wood chips and cutting debris. Thereafter, the wood chips and cutting debris are then conveyed from the brush cutter housing to the bale forming apparatus and fed into the bale forming apparatus. Ultimately, a bale of wood chips is formed in the bale forming apparatus.

In additional step, the wood chips of a desired size are separated from the cutting debris smaller than the desired size, prior to feeding the wood chips into the bale forming apparatus. In yet another step, the wood chips are ground, prior to feeding the wood chips into the bale forming apparatus.

In still another step, the bale of wood chips is formed by compacting the wood chips in a compaction chamber contained within the bale forming apparatus. In one option, the wood chips are acted upon in the compaction chamber using chain and slat conveyor assemblies. In another option, the wood chips are acted upon in the compaction chamber using chain and belt conveyor assemblies.

In still a further step, the bale of wood chips is wrapped with a wrapping material. Additionally, the method includes ejecting the bale of wood chips from the bale forming apparatus.

In accordance with still another embodiment of the present invention, there is provided an apparatus for baling wood chips. The baling apparatus has a housing which includes a front end, a rear end and a wood chip first collection chamber portion defined therein at a location closer to the front end than to the rear end. Means are disposed at the front end of the housing for feeding wood chip waste into the first collection chamber portion. Also provided, is means for physically separating the wood chips in the wood chip waste from dirt and other debris. The separating means is located at the bottom of the first collection chamber portion. The baling apparatus further includes a compacting device for forming a bale of wood chips. The compacting device has a second compacting chamber portion which is accessible from, and disposed rearward of, the first collection chamber portion. The baling apparatus further includes a wrapping station located behind or within the second compaction chamber portion. The wrapping station has a wrapping material dispenser which is operable to dispense wrapping material for wrapping around the bale of wood chips. An ejection site located at the rear of the housing permits the bale of wood chips to be ejected from the baling apparatus.

In accordance with yet a further embodiment of the invention, there is provided a method for baling wood chips. The method includes the steps of: feeding wood chip waste into a first collection chamber portion defined within the housing of a baling apparatus; separating the wood chips in the wood chip waste from dirt and other debris within first collection chamber portion; conveying the wood chips from the first collection chamber portion to a second compaction chamber portion; compacting the wood chips to form a bale of wood chips; wrapping the bale of wood chips with a wrapping material; and ejecting the bale of wood chips from the housing of the baling apparatus.

BRIEF DESCRIPTION OF THE DRAWINGS

The embodiments of the present invention shall be more clearly understood with reference to the following detailed description of the embodiments of the invention taken in conjunction with the accompanying drawing, in which.

DETAILED DESCRIPTION OF THE EMBODIMENTS OF THE INVENTION

Figure 1:
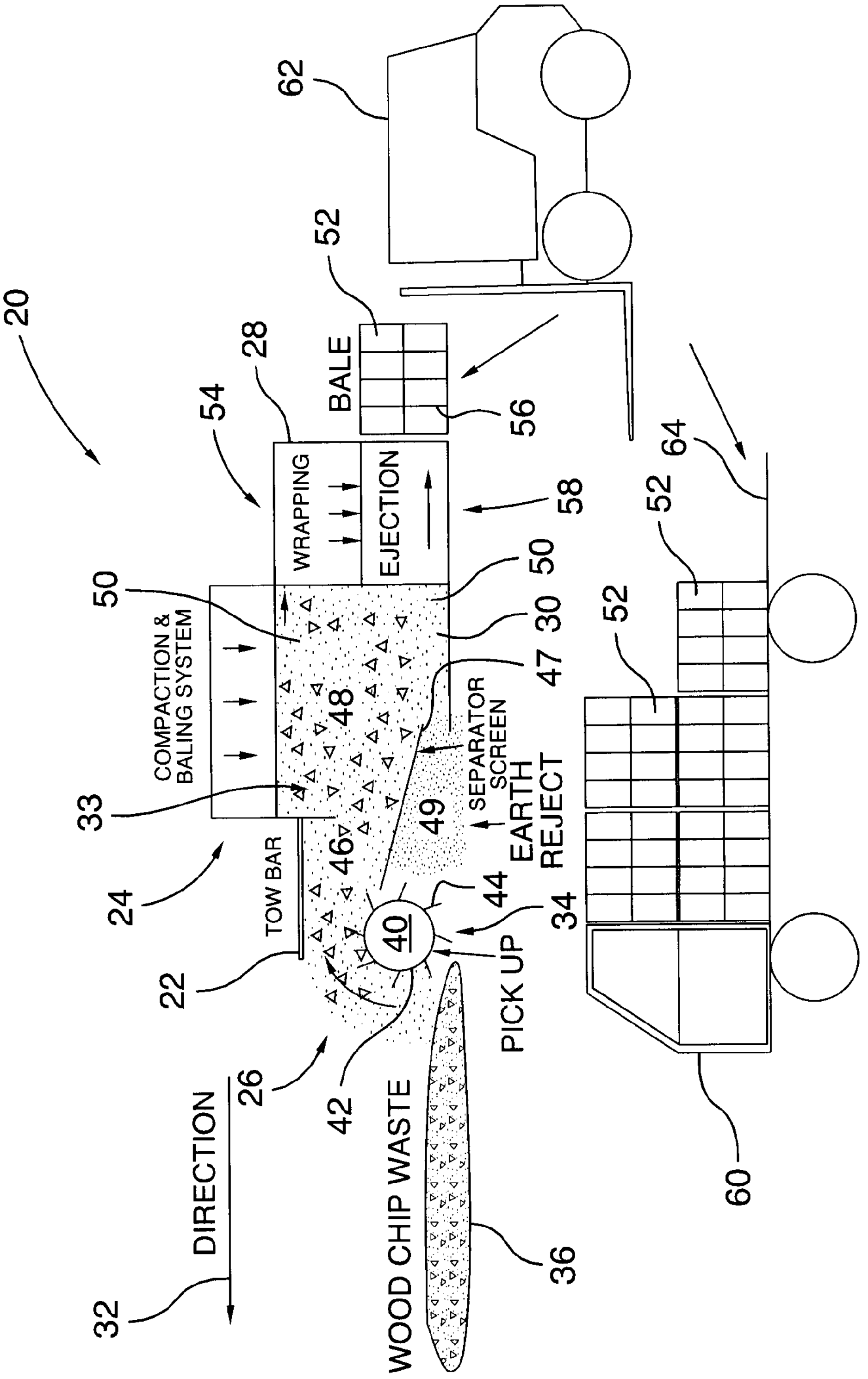
FIG. 1 is a conceptual schematic of an apparatus for baling wood chips formed during land clearing operations according to an embodiment of the present invention.
Figure 2:
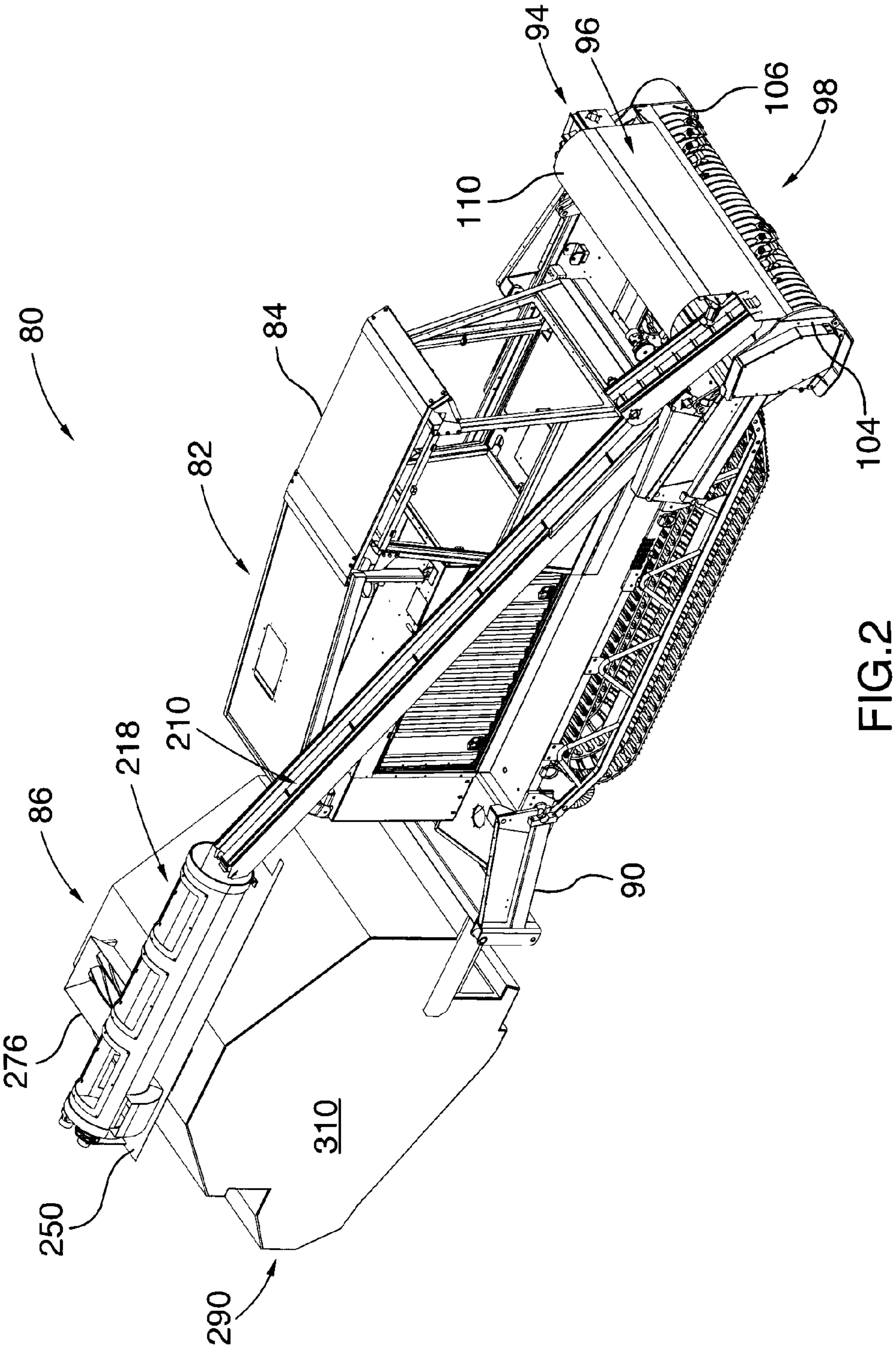
FIG. 2 is a perspective view of a brush cutting and wood chip baling apparatus according to another embodiment of the present invention.

The description which follows, and the embodiments described therein are provided by way of illustration of an example, or examples of particular embodiments of principles and aspects of the present invention. These examples are provided for the purposes of explanation and not of limitation, of those principles of the invention. In the description that follows, like parts are marked throughout the specification and the drawings with the same respective reference numerals.

Referring to FIG. 1, there is shown an apparatus for baling wood chips generally designated with reference numeral 20. The baling apparatus 20 may be of the type attached to the rear of a vehicle, such as a tractor or the like by way of a tow bar 22. The baling apparatus 20 has a housing 24 which is supported on wheels (not shown) for rolling motion on the ground. The housing 24 includes a front end 26 and an opposed rear end 28 and is partially defined by a pair of sidewalls 30 (only one which is shown in FIG. 1) extending between the front and rear ends 26 and 28. In this specification, front and rear direction indications are given with respect to the normal forward direction of the towing vehicle and baling apparatus 20 indicated by the arrow 32 in FIG. 1.

The housing 24 has a chamber 33 defined therein between the front and rear ends 26 and 28 and the sidewalls 30. The chamber 33 may be divided into two chamber portions—a first collection chamber portion 46 located adjacent the front end 26 and a second compaction chamber portion 48 disposed next to the first collection chamber portion 46 closer to the rear end 28 than the front end 26.

The front end 26 has an elongate opening 34 defined between the sidewalls 30 through which wood chip waste 36 may be received. Protruding through the opening 38 is a means 40 for feeding wood chip waste 36 into the baling apparatus 20. In this embodiment, the feeding means 40 takes the form of a cylindrical roller 42. The roller 42 carries on its outer surface a plurality of pickup tines or teeth 44 which are adapted to take up wood chip waste 36 into the first collection chamber portion 46 disposed rearward of the roller 42. The roller 42 is pivotally mounted between the sidewalls 30 and is driven for rotation by a drive assembly (not shown). Such drive assembly may include a motor and drive belt arrangement. In alternative embodiments, the cylindrical roller 42 may be configured differently. For instance, the pickup tines could be replaced with another suitable attachment for take up the wood chip waste, such as scoops or the like. In still other embodiments, different feeding means may be used to similar advantage.

Disposed at the bottom of the first collection chamber portion 46 is a separator screen 47. The separator screen 47 is adapted to perform a sieve-like function in that it facilitates the removal of small stones, dirt and other debris 49 from the wood chip waste 36 received in the first collection chamber portion 46. To this end, the separator screen 47 is provided with a plurality of apertures which are sized large enough to allow small diameter rocks and dirt 49 to be evacuated therethrough and discharged on the ground, but small enough to retain a substantial portion of the wood chips 50 within the baling apparatus 20. Means for vibrating the separation screen may also be provided to encourage material separation.

The first collection chamber portion 46 communicates with, and opens onto, compaction chamber 48. In the second compaction chamber portion 48, a bale forming compaction/baling device (not shown) compacts wood chips 50 to a variable size to form a bale 52. In the preferred embodiment, the compaction/baling device employs a plurality of aprons guided on rollers with each roller being supported on an arm which is moveable upwardly or downwardly by means of a hydraulic cylinder. This arrangement of aprons, rollers and arms is generally similar to that shown and described in U.S. Pat. No. 7,404,355; the contents of which are hereby incorporated by reference. In an alternative embodiment, a different compaction/baling device could be employed. In this embodiment, the bale 52 is shown to have a cylindrical shape. However, this need not be the case in every application. In other embodiments, the bale could be shaped differently.

Located adjacent or within the second compaction chamber portion 48 is a wrapping station 54 provided with a wrapping material dispenser (not shown). In operation, a bale 52 received within the wrapping station 54 will be rotated while the wrapping material dispenser dispenses a wrapping material 56 like twine, ribbon, net or wrapping sheet. As the bale 52 rotates, the wrapping material 56 will be caught by one or more edges of the bale thereby causing the wrapping material to wind or wrap around the bale 52. By wrapping the bales in this manner the structural integrity of the bales 52 may be preserved. Additionally, the bales 52 may be protected from the elements (as the rain or the like will tend to drip or run on the outer surface of the bale).

A rear door (not shown) is pivotally mounted at the rear end 28 of the housing 24. The rear door is moveable between an open and closed position. When the rear door is in the open position, the wrapped bale is free to travel to an ejection site 58 whereat it may be ejected from the baling apparatus 20.

Moving rearward, the wrapping station 54 gives way to an ejection site 58 which is located at the rear end 28 of the baling apparatus 20. During operation of the baling apparatus 20, the wrapped bales 52 are ejected from baling apparatus 20 at the ejection site 58.

An exemplary use of the baling apparatus 20 is now described. A vehicle (not shown) traveling in the direction indicated by arrow 34 tows the baling apparatus 20 over a pile of wood chip waste 36. As the baling apparatus 20 travels over the wood chip waste 36, the pick up tines 44 of roller 42 engage the wood chip waste 36 and the rotation of the roller causes the wood chip waste 36 to be propelled into the first collection chamber portion 46. As more wood chip waste 36 accumulates within the first collection chamber portion 46, the wood chip waste 36 is forced toward the rear of the first collection chamber portion 46 and is urged to pass over the separation screen 48. The motion of the baling apparatus 20 and the action of gravity cause the smaller sized rocks and dirt to separate from the wood chip waste and fall through the apertures defined in the separation screen 47 and onto the ground, leaving the wood chips 50 to continue traveling rearward to enter the second compaction chamber portion 48.

Within the second compaction chamber portion 48, a plurality of wood chips is compacted to a variable size to form a bale 52. Once the bale 52 is formed, the bale 52 may be acted upon by the wrapping material dispenser. More specifically, as the bale 52 rotates with the wrapping station 54 it is wrapped with wrapping material 56. The door provided at the rear of the housing 24 will be moved to its open position to thereby allow the wrapped the bales 52 to make their way to the ejection site 58 whereat they are ejected from the rear end 28 of the baling apparatus 20. The ejected bales 52 may be left on the ground for later pick up. When a sufficient number of bales 52 have been formed, a vehicle such as a flat bed vehicle 60 may dispatched to the field for collection of the bales 52. The bales 52 could then be stacked with the aid of lifting machinery (for example, a fork lift 62) onto the flat bed 64 of vehicle 60 for transport to a storage facility or other facility for immediate use.

While in the preferred embodiment, the baling apparatus 20 is used to bale wood chips formed during land clearing operations, it will be appreciated that the baling apparatus 20 may also successfully be used in other applications where wood chips are formed.

By baling the wood chips in accordance with the principles of the present invention, the collection, storage and transport of wood chips is facilitated while not substantially altering the physical properties of the wood chips. As a result, wood chips which would have otherwise been left to decompose (or as compost) in the field can now be put to good use. For instance, the baled wood chips could be sold to wood product manufacturers for use as filler. Baled wood chips could become a commodity much like recycled newspaper print—it could be bought and sold and would allow the owner of the cleared land to generate additional revenue.

In the embodiment described above, the wood chips 50 are taken up from the ground by feeding means 40 (in the nature of a roller 42 provided with a plurality of pickup tines or teeth 44) which is disposed at the front end 26 of the baling apparatus 20. Thus configured, the feeding means 40 forms part of the baling apparatus 20. While it will be appreciated that, configured in this manner, the baling apparatus 20 can be successfully used while (or immediately after) land clearing operations are performed, this arrangement tends to be particularly advantageous in applications where the collection and baling of wood chips take places at some later time (e.g. hours or days) after the performance of land clearing operations and the creation of the wood chips. With the feeding means 40 built into the baling apparatus 20, there is no need for any specialized equipment to take up the wood chips. Moreover, the baling apparatus 20 can be towed by any suitable vehicle with hauling capabilities.

However, this need not be the case in every application. As will be appreciated by a person skilled in the art, the principles of the present invention could be applied differently in alternative embodiments. For example, an alternative baling apparatus could be configured without means for taking up wood chips from the ground. In such an embodiment, the wood chip take up function could be carried out by other equipment. Such other equipment would be operable to convey the wood chips away from the ground and directly feed them into the compaction chamber of the baling apparatus to be formed into bales. In one such embodiment, with appropriate modifications a brush cutter mounted to a vehicle could be used to simultaneously shred brush and the like while conveying the resultant wood chips into the baling apparatus that is hitched to the vehicle, via one or more conveyor systems or assemblies. In this way, the brush cutting and wood chip baling operations could be combined and substantially carried out in a single pass of the vehicle over the terrain to be cleared, thereby saving time, effort and the provision of additional vehicles or equipment. One such exemplary embodiment is described below.

Referring to FIGS. 2, 3, 4 and 7, there is shown a brush cutting and wood chip baling apparatus 80. The apparatus 80 includes a vehicle 82 in the nature of a skid steer 84, and a wood chip bale forming apparatus or baler 86 hitched to the rear of the skid steer 84 by way of coupling arms 90. Mounted at the front of the skid steer 84, is a brush cutter 94. The brush cutter 94 includes an open-bottom housing 96 and a brush cutting head 98 rotatably mounted within the housing 96. The apparatus 80 is further provided with a plurality of conveyor assemblies to move or transport the wood chips 50 formed by the cutting action of the brush cutting head 98 at the front of the skid steer 84 to the bale forming apparatus 86 located at the rear of the skid steer 84. In this embodiment, the plurality of conveyor assemblies includes first, second, third and fourth conveyor assemblies 140, 166, 210 and 218, respectively.

Figure 5:
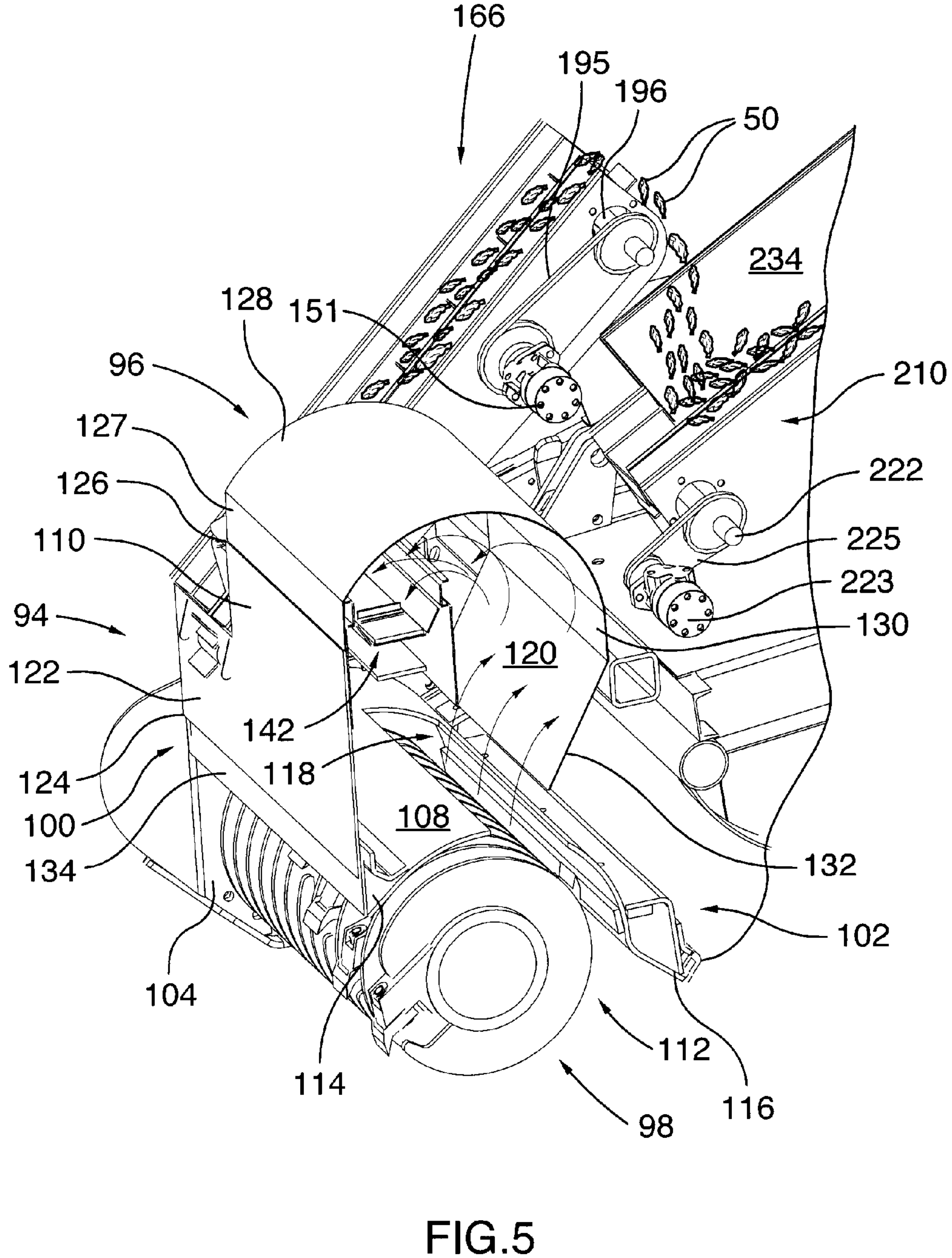
FIG. 5 is a partial cross-sectional, perspective view of the brush cutting and wood chip baling apparatus of FIG. 7 taken along line "5-5" showing the interior of the brush cutter.
Figure 7:
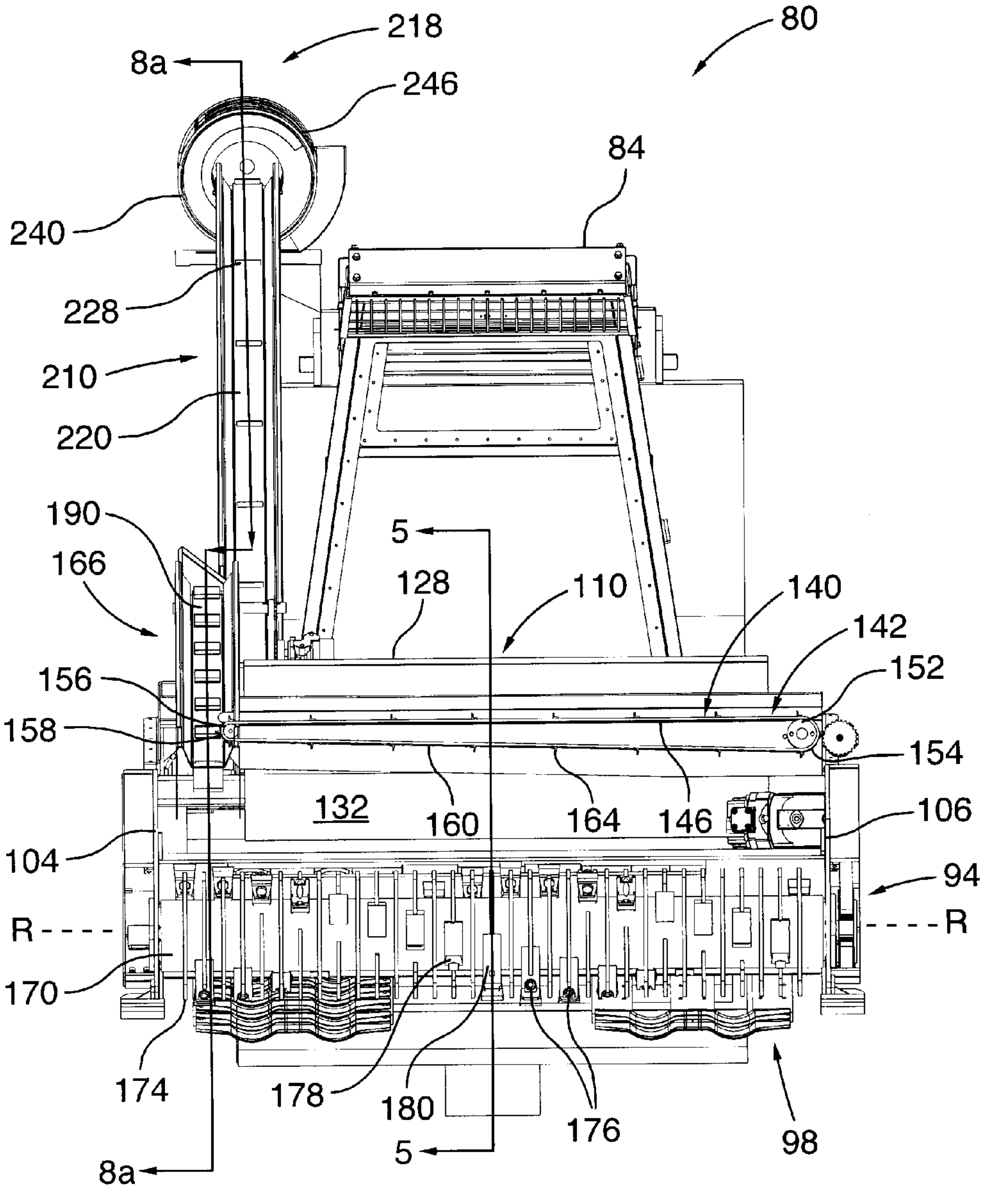
FIG. 7 is a front end elevation view of the brush cutting and wood chip baling apparatus of FIG. 2 with the cover panel of the brush cutter housing removed to reveal details of the first conveyor assembly.
Figure 8A:
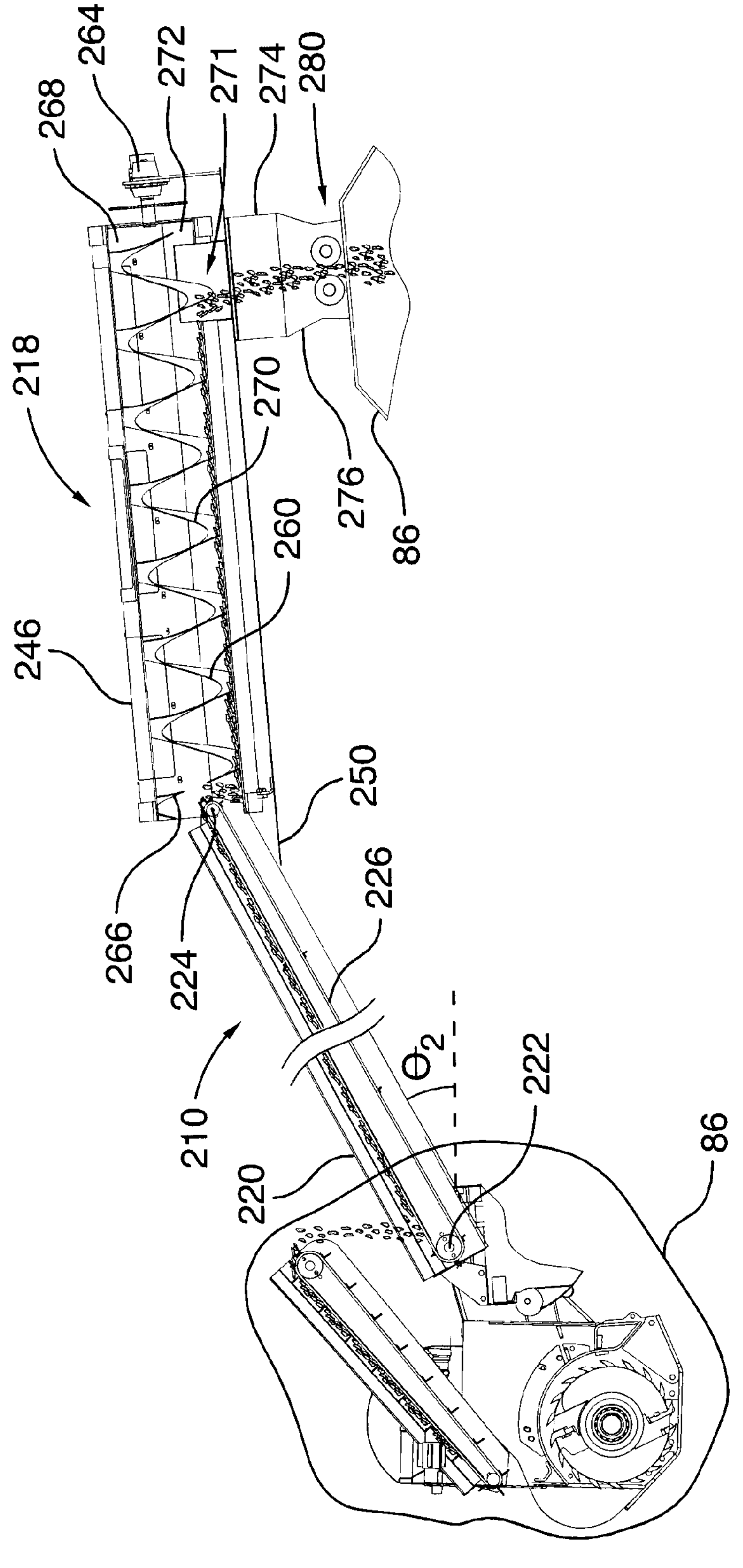
FIG. 8*a* is another cross-sectional view of the brush cutting and wood chip baling apparatus of FIG. 7 taken along line "8*a*-8*a*" showing details of the second, third and fourth conveyor assemblies.
Figure 8B:
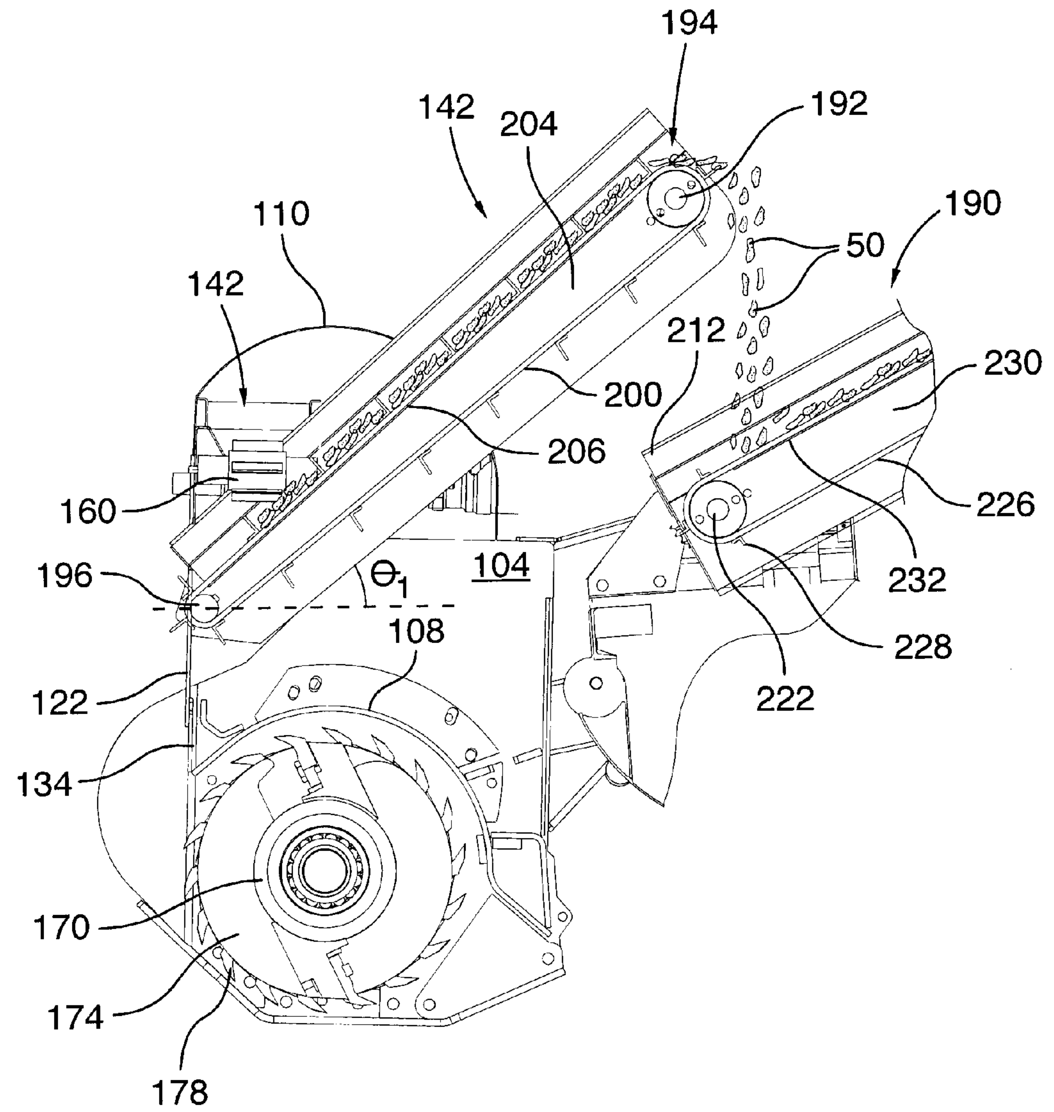
FIG. 8*b* is an isolated, magnified view of the second conveyor assembly shown in FIG. 8*a;*

Referring to FIGS. 5, 7 and 8*b*, the housing 96 has a front end 100 and a rear end 102 and is defined generally by a pair of first and second side panels 104 and 106, a curved wall 108 extending longitudinally between and joined to the side panels 104 and 106, and a substantially semi-circular, cover panel 110 disposed above the curved wall 108. The curved wall 108 runs between the front and rear ends 100 and 102 of the housing 96 and is carried roughly midway between the upper and lower ends of the side panels 104 and 106. The curved profile of the wall 108 partially defines a well 112 which is sized to accommodate the brush cutting head 98. The wall 108 is provided with a large cutout 118 disposed between the front and rear margins 114 and 116 of the wall 108. The cutout 118 spans nearly the entire length of wall 108. As will be explained in greater below, the cutout 118 defines a passageway between the well 112 and an interior space 120 of the housing 96 to allow wood chips 50 from within the well 112 to travel into the interior space 120.

The cover panel 110 is made from a bent sheet of relatively pliable and lightweight, nylon material whose surface has a relatively low coefficient of friction. Alternatively, the cover panel could be made of steel. The cover panel 110 includes a first relatively wide straight portion 122 having first and second margins 124 and 126, a second relatively narrow portion 127, a third arcuate portion 128, a fourth relatively narrow straight portion 130, and a fifth straight portion 132. The first margin 124 of the first straight portion 122 is joined to a horizontal member 134 which is itself fastened to the front margin 114 of the curved wall 108. The first straight portion 122 extends upwardly from the well 112 and joins with the second straight portion 127 at the second margin 126. Similarly, the second portion 127 extends upwardly to connect to the third arcuate portion 128. The third arcuate portion 128 is shaped like an inverted "U" and extends towards the rear of the housing 96. The fourth straight portion 130 is connected to the third arcuate portion 128 along the rear margin thereof. The fourth straight portion 130 runs downwardly until it meets the fifth straight portion 132. The fifth straight portion 132 extends diagonally into the interior spaced 120 and is angled inwardly toward, but spaced from, the cutout 118. Configured in this manner, the fifth straight portion 132 functions as a deflector for directing wood chips 50 the interior space 120 though the cutout 118.

Disposed in the front upper region of the interior space 120 and extending generally parallel to the cutout 112, is a first conveyor assembly 140 in the nature of a belt conveyor assembly 142. The belt conveyor assembly 142 is supported on a frame 144 which is fastened to the cover panel 110. The frame 144 is generally channel-shaped and includes a back 146 and pair of opposed sidewalls 148 and 150 joined to either side of the back 146 and projecting downwardly therefrom. The assembly 142 includes a drive pulley 152 disposed at the first end 154 of the assembly 142, an idler 156 disposed at the second opposite end 158 of the assembly 142 and a conveyor belt 160 extending between the drive pulley 152 and idler 156 and supported on the depressed center portion 162 of back 146. Both the drive pulley 152 and idler 156 extend between, and have their respective ends supported by, the sidewalls 148 and 150. In this embodiment, the conveyor belt has a length $L_1$ of 78.5 inches as measured between the centers of the drive pulley 152 and the idler 156.

Also provided is a motor (not shown) for driving rotation of the drive pulley 152. Preferably, the motor is a hydraulic motor. In this embodiment, the rotation of the drive pulley 152 is counterclockwise (as shown in FIG. 7), thereby causing the conveyor belt 160 to move in the direction of (or towards) the first side panel 104 of the housing 96. To facilitate transport of the wood chips 50, the conveyor belt 160 is an elevator belt formed with a plurality of regularly spaced partition elements 164. In operation, the belt conveyor assembly 142 carries wood chips 50 deposited onto the conveyor belt 160 toward a second conveyor assembly 166 disposed adjacent the first side panel 104.

Turning now to the brush cutting head 98, it is mounted longitudinally between the first and second side panels 104 and 106 and supported on bearing assemblies (not shown) for rotational motion about an axis of rotation R-R (as best shown in FIG. 7). A drive assembly (not shown) is operatively connected to the brush cutting head 98 to drive rotation thereof. The brush cutting head 98 includes a tubular support body 170 having a curved outer surface 172 that defines the circular cross-section of the support body 170. Concentrically mounted to the support body 170 at spaced intervals along its outer surface 172, is a plurality of protective collars 174. Between each adjacent pair of collars 174 is mounted a cutting tooth assembly 176. The assembly 176 includes a cutting tooth 178 and a mounting assembly 180 for securely fixing the cutting tooth 178 within a station defined between the pair of adjacent collars 174. In this embodiment, the plurality of cutting tooth assemblies 176 are disposed along the support body 170 in a generally double helix pattern thereby permitting cutting across the entire length of the support body 170 when the brush cutting head 98 is rotated about its longitudinal axis 'R-R'.

When the brush cutting head 98 is actuated, the support body 170 will be urged to rotate thereby causing the cutting edges of the cutting teeth 178 to make contact with the brush. The cutting action of the teeth 178 shreds the brush and forms wood chips and other cutting debris. By reason of its configuration the brush cutting head 98 also performs a take up function, that is, it takes up (or picks up) the wood chips and other cutting debris from the ground and urges them toward the interior space 120 in the housing 96.

Referring now to FIGS. 6, 7, 8*a* and 8*b*, the second conveyor assembly 166 is now described in greater detail. The second conveyor assembly 166 is carried on the housing 96 with its lower end 182 supported on the outer surface of the curved wall 108 and fastened to the cover panel 110. In this embodiment, the assembly 166 is oriented generally perpendicular to the first conveyor assembly 140, but is positioned on an incline (the angle $\theta_1$ of which measures 45 degrees relative to a horizontal reference plane parallel to the ground). In this orientation, the lower end 182 of the assembly 166 occupies a position that is in front of, and beneath, the second end 158 of the belt conveyor assembly 142. In an alternative embodiment, a different angle of incline for the assembly 166 could be employed.

In this embodiment, the second conveyor assembly 166 takes the form of a belt conveyor assembly 190. The assembly 190 is generally similar to the belt conveyor assembly 142 in that it too has a drive pulley 192 disposed at the upper end 194 of the assembly 166, an idler 196 disposed at the lower end 182 of the assembly 166, a conveyor belt 200 extending between the drive pulley 192 and idler 196 and a motor 193 and drive belt arrangement 195 for driving rotation of the drive pulley 192. Preferably, the motor is a hydraulic motor. In like fashion to the conveyor belt 160, the conveyor belt 200 has partition elements 202. These partition elements 202 tend to facilitate vertical transport of the wood chips 50 along the second conveyor assembly 166. In this embodiment, the conveyor belt 200 has a length of $L_2$ is 43.5 inches as measured between the centers of the drive pulley 192 and the idler 196. In other embodiments, the length of the conveyor belt 200 could be adjusted to suit a particular configuration of conveyor assemblies. The belt conveyor assembly 190 is also provided with a frame 204 not unlike frame 144, whose depressed center portion 206 supports the conveyor belt 200 along its length. The drive pulley 192 and idler 196 are connected to the frame 204 in much the same manner as counterpart drive pulley 152 and idler 156 are connected to frame 144.

In this embodiment, the drive pulley 192 is driven to rotate clockwise (when viewed as shown in FIG. 8*b*) by the motor 193 and drive belt arrangement 195, thereby causing the conveyor belt 200 to move upwardly and rearward. By reason of its position relative to the belt conveyor assembly 142 (i.e. a portion of the conveyor belt 200 located upwardly from the lower end 182 being located directly beneath the second end 158 of the assembly 142), the belt conveyor assembly 190 receives wood chips 50 which drop off from the conveyor belt 160 at the second end 158. The wood chips 50 deposited onto the conveyor belt 200 are then transported toward a third conveyor assembly 210 which is positioned rearward of the assembly 190.

Figure 3:
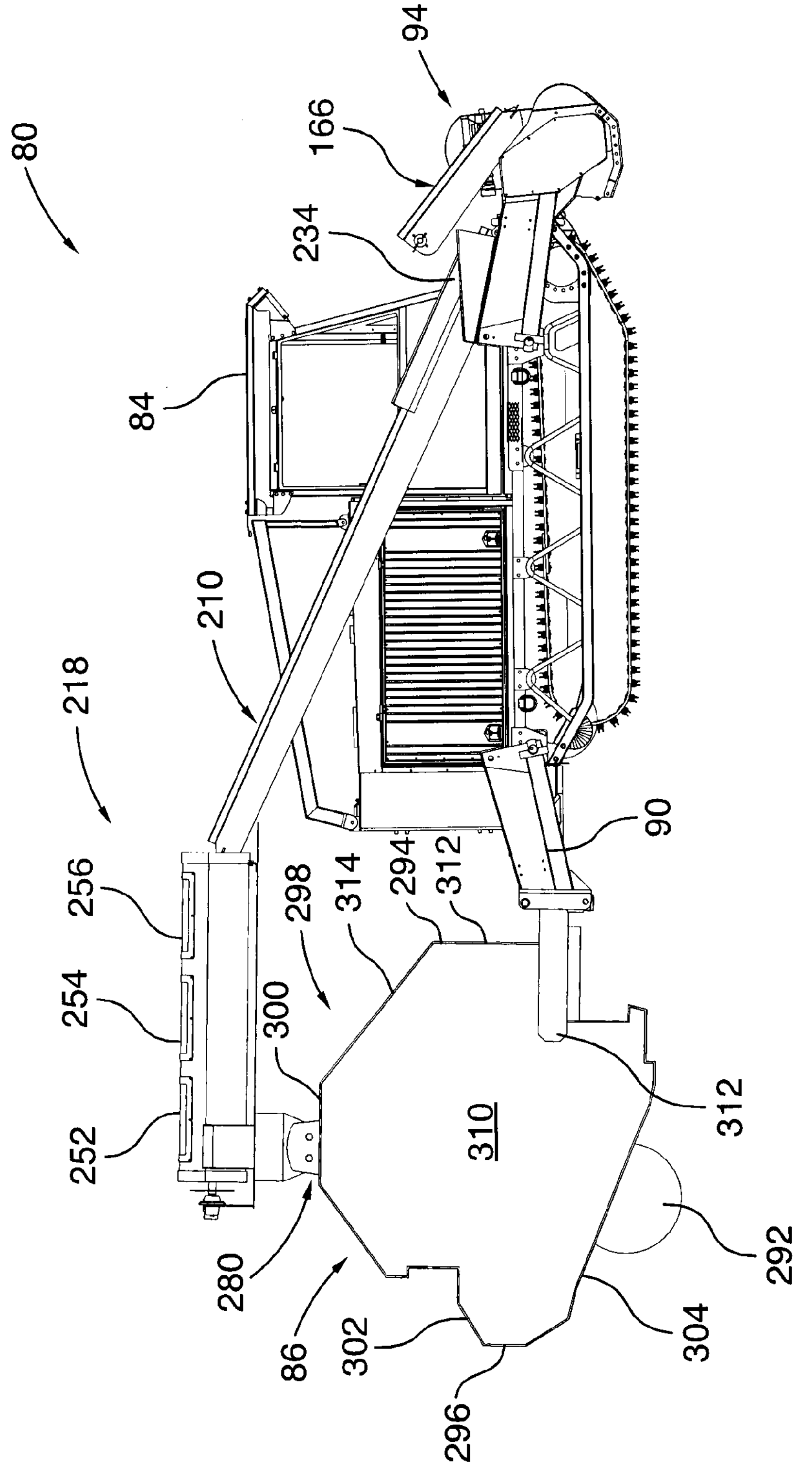
FIG. 3 is a side elevation view of the brush cutting and wood chip baling apparatus of FIG. 2 with a side panel of the bale forming apparatus removed to reveal details of the baling mechanism therein.

Referring now to FIGS. 3, 8*a* and 8*b*, the third conveyor assembly 210 has a lower end 212 attached to the front body portion 214 of the skid steer 84, and upper end 216 supported on a fourth conveyor assembly 218 mounted atop the wood chip baling apparatus 86. In like fashion to the second conveyor assembly 166, the assembly 210 extends on an incline relative to a horizontal reference plane parallel to the ground (see FIG. 8*a*). In this embodiment, the angle of incline $\theta_2$ of the assembly 210 measures 25 degrees relative to the horizontal reference plane. In an alternative embodiment, a different angle of incline for the assembly 210 could be employed. When viewed from the top, the assembly 210 is oriented generally parallel to the second conveyor assembly 146 but is inwardly offset relative thereto. Additionally, the lower end 212 of the assembly 210 occupies a position that is in front of, and beneath, the upper end 194 of the belt conveyor assembly 190.

In this embodiment, the third conveyor assembly 210 also takes the form of a belt conveyor assembly 220. The assembly 220 is generally similar to the first and second belt conveyor assemblies 142 and 190. It includes a drive pulley 222 disposed at the lower end 212 of the assembly 210, an idler 224 disposed at the upper end 216 of the assembly 210, a conveyor belt 226 extending between the drive pulley 222 and idler 224 and a motor 223 and drive belt arrangement 225 for driving rotation of the drive pulley 222. In like fashion to the conveyor belt 200, the conveyor belt 226 has partition elements 228 which tend to facilitate vertical transport of the wood chips 50 along the third conveyor assembly 210. In this embodiment, the conveyor belt 200 has a length of $L_3$ is 185.5 inches as measured between the centers of the drive pulley 222 and the idler 224. In other embodiments, the length of the conveyor belt 200 could be adjusted to suit a particular configuration of conveyor assemblies.

The belt conveyor assembly 210 is also provided with a frame 230 not unlike frame 144, whose depressed center portion 232 supports the conveyor belt 226 along its length. The drive pulley 222 and idler 224 are connected to the frame 230 in much the same manner as counterpart drive pulley 192 and idler 196 are connected to frame 204. In this embodiment, the drive pulley 222 is driven to rotate clockwise (when viewed as shown in FIG. 8*a*) by a motor (not shown), thereby causing the conveyor belt 226 to travel upwardly towards the rear of the apparatus 80.

Figure 4:
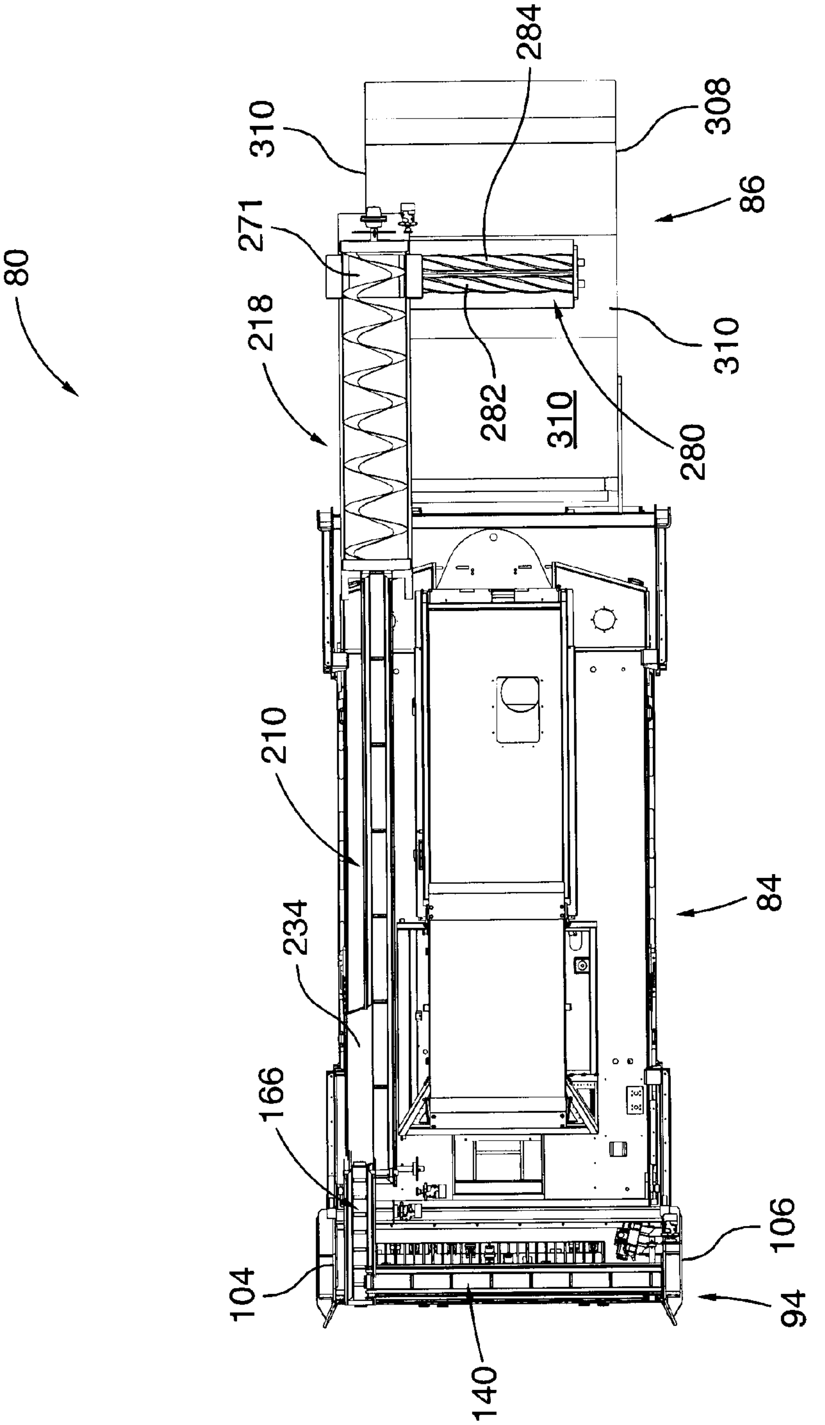
FIG. 4 is a top view of the brush cutting and wood chip baling apparatus of FIG. 2 with the cover panel of the brush cutter housing removed to reveal details of the first conveyor assembly and the upper body portion of the fourth conveyor assembly removed to reveal details of the screw conveyor assembly.

During brush cutting and baling operations, the wood chips 50 that drop off the upper end 194 of the belt conveyor assembly 190 fall onto a chute 234 (as best shown in FIG. 4) connected to the frame 230. The chute 234 directs the wood chips 50 toward the third belt conveyor assembly 210, where they are deposited onto the conveyor belt 226 and transported toward the fourth conveyor assembly 218.

Referring now to FIGS. 2, 4, 8*a* and 9, the fourth conveyor assembly 218 has a generally tubular body or casing 240 provided with a front end 242 and a rear end 244, and a screw member 246 housed with the casing 240. The casing 240 has a horizontal orientation, but its longitudinal axis is substantially aligned with that of the third belt conveyor assembly 220 such that wood chips 50 from assembly 220 can be easily fed into the fourth conveyor assembly 218. The casing 240 is supported for rotation at either end thereof on a frame 248 made up substantially of a support plate 250. Disposed along the upper portion of the casing 240 are three spaced apart transparent panels 252, 254 and 256 provided to allow the operator to peer into the interior space of the casing 240 to view the screw member 246. The casing 240 is apertured much like a screen such that as the wood chips and cutting debris travel through the fourth conveyor assembly, the wood chips that are larger than the apertures in the casing 240 are retained within the fourth conveyor assembly, while those particles that are smaller than the apertures are discharged from the casing 240.

In this embodiment, the screw member 246 takes the form of a shaftless spiral 260 whose outer edges are fixed to the inner surface of the casing 240 so that the casing 240 and shaftless spiral 260 can be made to rotate as a single unit. A (preferably hydraulic) motor 264 is operatively connected at the rear end 268 of the shaftless spiral 260 to drive the rotation of the fourth conveyor assembly 218. In this embodiment, the shaftless spiral 262 has a diameter of 9.5 inches, a pitch of 12 inches and a length $L_4$ of 92 inches. In other embodiments, the pitch of the shaftless spiral could be adjusted and its length could be lengthened or shortened to suit a particular application.

While the use of a shaftless spiral tends to be preferred for keeping the assembly 246 generally lightweight, in other embodiments, the shaftless spiral could be replaced with an auger member provided with a shaft carrying a helical blade arrangement. Additional modifications are possible. For instance, in other applications, the fourth conveyor assembly could take the form of a screw conveyor assembly with a screw member being freely rotatable within the casing. In such an embodiment, the casing would be fixed to support frame and would not rotate when the screw member assembly is actuated.

In operation, as the casing 240 and spiral 260 are driven to rotate, the blade portions 270 of the spiral carry the wood chips 50 rearward toward an arcuate cutout 271 (visible in FIG. 8*a*) defined in the lower portion 272 of the casing 240 adjacent the rear end 244. The cutout communicates with an aperture (not visible) in the support plate 250 which itself gives on to a chute 274 attached to the support plate 250 and positioned directly beneath the aperture. The chute 274 feeds into an open-topped, generally trapezoidal hopper 276 mounted atop the baling apparatus 220. Disposed at the bottom of the hopper 276 is a grinding assembly 280 operable to break the wood chips into still smaller and more uniform pieces.

In this embodiment, the grinding assembly 280 includes of a pair of horizontal cylindrical rollers 282 and 284 extending parallel to each other (and arranged generally perpendicular to the screw conveyor assembly 246) with a relatively very small gap G provided between them. The gap G is dimensioned to allow only material of a certain size or smaller to pass through between the rollers 282 and 284. When the grinding assembly 280 is actuated, the rollers 282 and 284 will be driven to rotate in opposite directions, thereby pushing the wood chips through the gap G. As this occurs, the pressure applied to the wood chips causes these to fracture into smaller pieces. The ground wood chips are then discharged into the bale forming apparatus 86.

While the grinding assembly 280 in this embodiment takes the form of a pair of high pressure counter-rotating rollers, it will be appreciated that in alternative embodiments other types of grinding assemblies could be used to similar advantage. In other embodiments, the grinding assembly may be relocated to another position along the conveyance path.

Use of the grinding assembly 280 tends to be particular advantageous in those applications where it is desired to have bales of wood chips having a certain uniformity and density. The commoditization of wood chip bales may well place a premium for such bales in the market place. However, in other alternative applications, the need for uniformity in the wood chips forming the bale may not be important or particularly desirable. In such applications, the apparatus 80 could be fabricated without a grinding assembly and the fourth conveyor assembly could be configured to discharge the woods chips directly into the wood chip baling apparatus 220.

Figure 9:
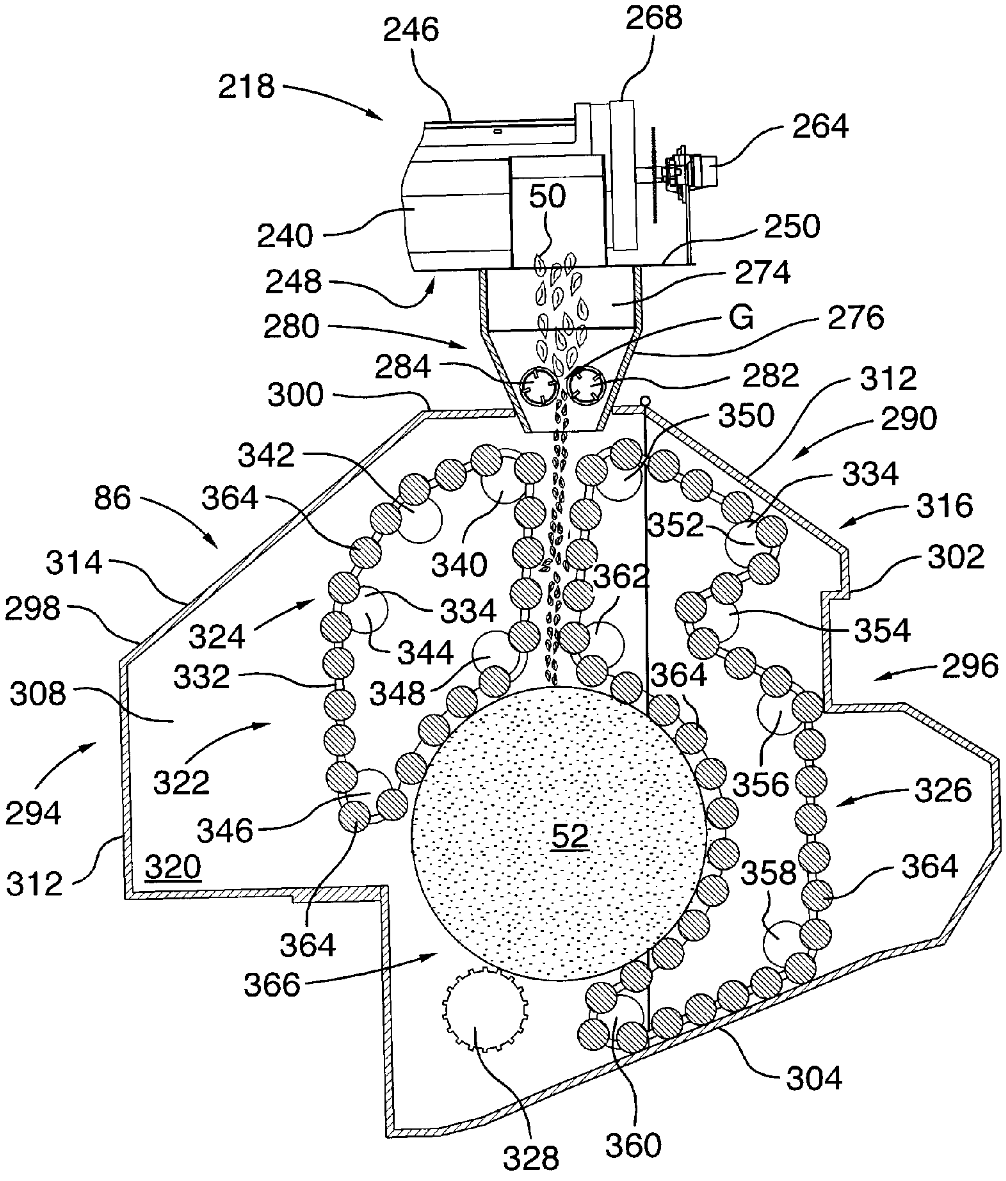
FIG. 9 is a cross-sectional view of the bale forming apparatus shown in FIG. 4 taken along line "9-9" showing details of the baling mechanism of the bale forming apparatus and the movable panel in its closed position.
Figure 10:
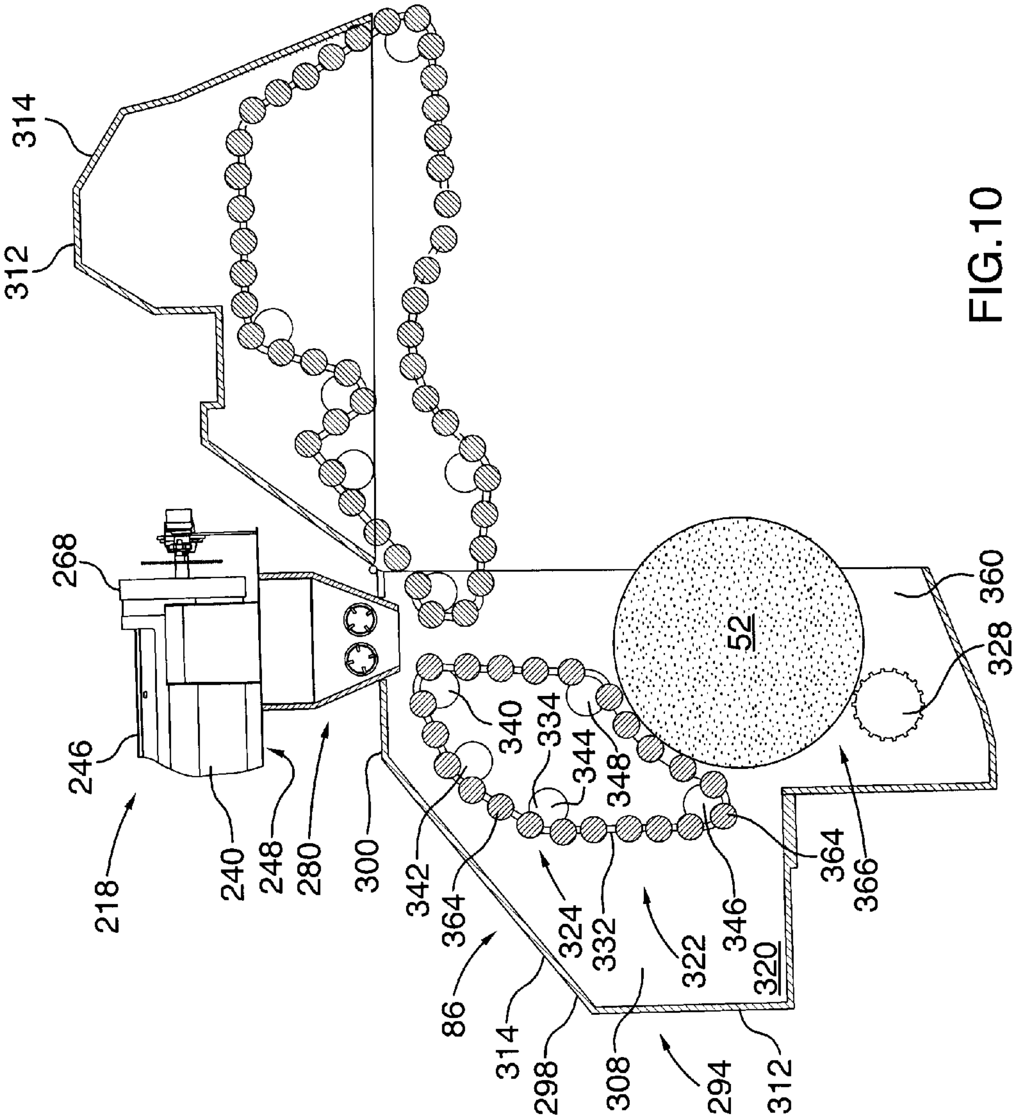
FIG. 10 is a view similar of the bale forming apparatus to that shown in FIG. 9 except that the movable panel is in its open position.
Figure 11:
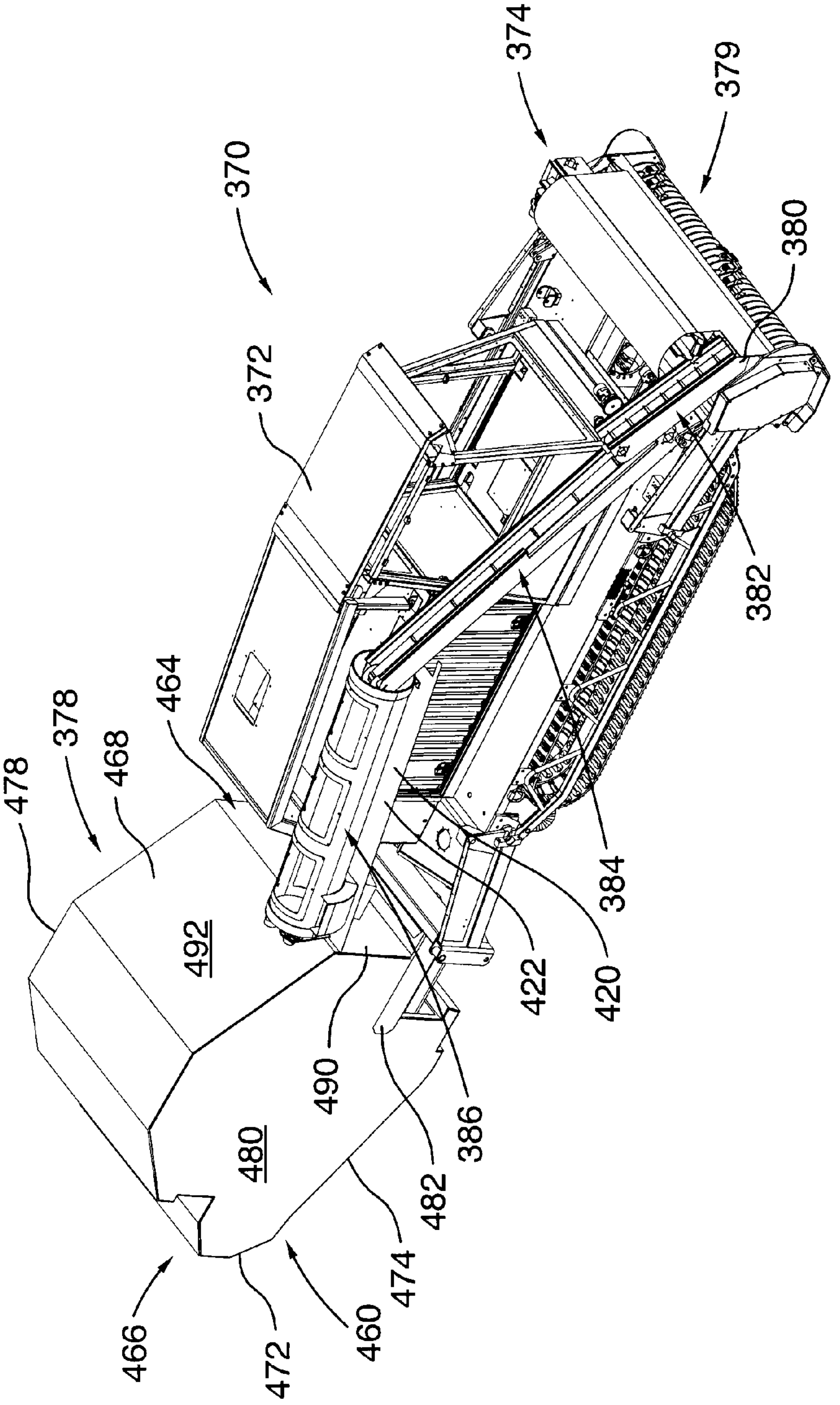
FIG. 11 is a perspective view of a brush cutting and wood chip baling apparatus according to still another embodiment of the present invention.

With reference to FIGS. 9 and 10, the bale forming apparatus 86 is now described in greater detail. The bale forming apparatus 86 has a housing 290 which is supported on wheels 292 for rolling motion on the ground. The housing 290 includes a front end 294 and an opposed rear end 296, and is defined by a front panel 298, a top panel 300, a rear panel 302, a bottom panel 304, a pair of sidewalls 308 and 310 extending between the front and rear ends 294 and 296. A pair of towing arms 312 is provided to connect the bale forming apparatus 86 to the coupling arms 90 of the skid steer 84.

The front panel 298 has a first vertically-extending panel portion 312 and a second inclined panel portion 314. The second panel portion 314 joins the upper extremity of the first panel portion 312 and extends upwardly and rearward thereof to meet the top panel 300. The top panel 300 extends horizontally a short distance until it joins to the rear panel 302. Adjacent the juncture of the top panel 300 with the rear panel 302, the top panel has defined therein an aperture (not visible) which communicates with the bottom open end of the hopper 276 to allow wood chips 50 contained in the hopper 276 to pass into the bale forming apparatus 86.

The rear panel 302, which spans between the top panel 300 and the bottom 304, has a generally irregular profile. A portion of the rear panel 302 defines a movable door panel 312 hingedly connected to the top panel 300. The door panel 312 is movable between an open position 314 (shown in FIG. 10*b*) which permits a formed bale to be released from within the bale forming apparatus and a closed position 316 (shown in FIG. 9).

The housing 290 has an interior chamber 320 defined between the front and rear panels 298 and 302, the top and bottom panels 300 and 304, and the sidewalls 308 and 310. Disposed within the interior chamber 320 is a baling mechanism 322 of the type generally known in the art such that only a high-level description is required for the purposes of illustrating the principles of the invention as applied to this embodiment. Shown conceptually in FIGS. 9 and 10, the baling mechanism 322 includes first and second chain and slat conveyor assemblies 324 and 326 and a rotatable, toothed shaft 328 extending between the sidewalls 308 and 310. Each conveyor assembly 324, 326 employs a pair 328, 330 of endless drive chains 332 configured for continued rotation and a plurality of guide rollers 334 having drive sprockets (not shown) engageable with the drive chains 332. In the case of each conveyor assembly 324, 326, one drive chain 332 of the pair is positioned adjacent the side wall 308 of the housing 290 while the other drive chain 332 of the pair is positioned adjacent the opposite sidewall 310.

In each conveyor assembly 324 and 326, some of the guide rollers 334 are fixed and others are movable. In the first conveyor assembly 324, the plurality of guide rollers 334 includes five guide rollers—first, second, third fourth and fifth guide rollers 340, 342, 344, 346 and 348, respectively. In this embodiment, the first, second, third and fourth guide rollers 340, 342, 344 and 346 are fixed while the fifth guide roller 348 is movable relative to the others. In the second conveyor assembly 326 seven guide rollers are used—first, second, third, fourth, fifth, sixth and seventh 350, 352, 354, 356, 358, 360 and 362 guide rollers. In present embodiment, the third and seventh guide roller 354 and 362 are movable while the remaining guide rollers 350, 352, 356, 358 and 360 are stationary. Hydraulic pistons (not shown) are used to move the movable guide rollers 348, 354 and 362. In alternative embodiments, a different number of guide rollers (fixed and/or movable) could be used for either or both of the conveyor assemblies 324 and 326.

A plurality of transverse, spaced apart and generally parallel, slats 364 are supported between each pair 328, 330 of drive chains 332. The spacing between the slats 364 is selected to ensure that wood chips of a desired size are maintained within the compaction chamber 366 defined in the variable-sized space bounded by the first and second conveyor assemblies 324 and 326. In this embodiment, the slats 364 have a generally circular cross section. In other embodiments, the slats could be flat or shaped differently still. In yet a further alternative embodiment, the conveyor assemblies of the bale forming apparatus 86 could use different linkages or could be apron chain-type conveyors with overlapping or interlocking plates or the like forming a continuous moving bed when actuated. Other modifications are also possible.

The baling mechanism 322 is also provided with an assembly (not shown) for wrapping the outer surface of the bale 52 with twine, net wrap or the like to thereby protect the bale from the elements.

In operation, the wood chips 50 discharged through the aperture formed in the top panel 300 fall into the interior chamber 320 where they are acted upon by the toothed shaft 328 and the slats 364 as the drive chains 322 travel over the guide rollers 334. The gripping action of the slats 364 pulls the wood chips 50 into the compaction chamber 366 and applies pressure to the wood chips as they are rotated within the compaction chamber 366. The compaction of the wood chips during rotation, results in the creation of a bale core which grows as more wood chips are fed into the compaction chamber 366. The movable guide rollers 348, 354 and 362 allow the arrangement of the drive chains 322 and slats 364 to be reconfigured so as to adjust to shape of the increasingly large core. When the core has reached the desired size, the bale 52 is wrapped and then released from the compaction chamber 366 and exits the bale forming apparatus 86 through the opening 368 formed by moving the door panel 312 to its open position 314.

An exemplary use of the brush cutting and wood chip baling apparatus 80 is now described in greater detail with reference to FIGS. 4, 5, 6, 8*a*, 8*b*, 9 and 10. The operator of the apparatus 80 drives the skid steer 84 over a patch of land to be cleared and actuates the brush cutter 94. The brush cutting head 98 is urged to rotate along its rotational axis "R-R" causing the cutting teeth 178 carried on the support body 170 to make cutting contact with brush and small trees. The cutting action of the teeth 178 shreds the brush reducing it to wood chips 50 and other cutting debris. At the same time (or at substantially the same time), the rotational movement of the brush cutting head 98 causes the wood chips 50 to be taken up through the well 112 and into the interior space 120 of the housing 96. As shown in FIG. 5, the wood chips 50 are propelled through the cutout 118 defined in the curved wall 108 and directed upwardly and rearward along the fifth straight portion 132. The wood chips 50 then follow the profile of the cover panel 110 by traveling up the fourth straight portion 130 and then around the third arcuate portion 128 to ultimately land onto the conveyor belt 160 of the belt conveyor assembly 142. The direction of travel by the wood chips 50 is shown by the arrows in FIG. 5. It will thus be appreciated that the third, fourth and fifth portions of the cover panel serve to guide the wood chips toward the first conveyor assembly 140.

Figure 6:
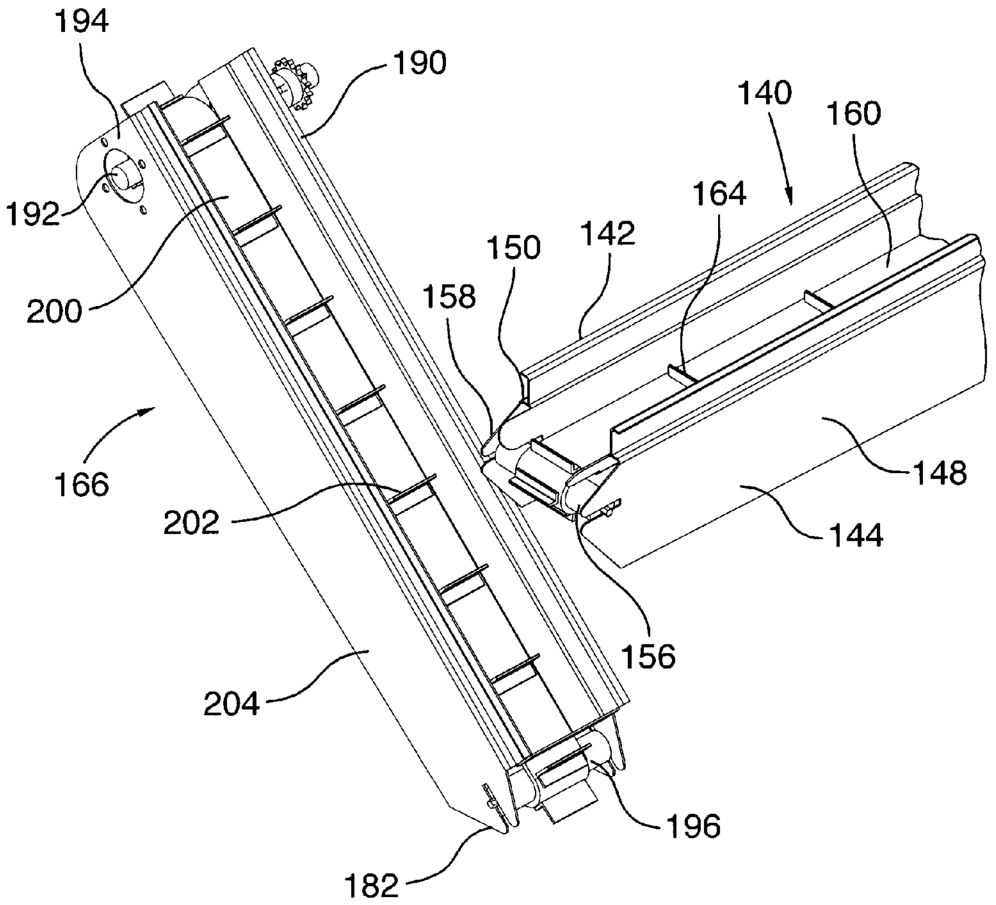
FIG. 6 is an isolated, magnified view of portions of the first and second conveyor assemblies shown in FIG. 2.

Referring now to FIGS. 4 and 6, once on the conveyor belt 160, the wood chips 50 travel toward the second end 158 of the assembly 142. At the second end 158, the wood chips 50 fall off the conveyor belt 160 and onto the conveyor belt 200 of the second conveyor assembly 166. The assembly 166 carries the wood chips 50 up to the rear end 196 thereof, at which point the wood chips 50 drop off the conveyor belt 200 and onto the chute 234 which directs the wood chips 50 toward the third conveyor assembly 210. The wood chips 50 in the chute 234 discharge onto the conveyor belt 226 and are transported upwardly and rearward toward the fourth conveyor assembly 218 (see FIG. 8*b*). At the upper end 216 of the third conveyor assembly 210, the wood chips 50 drop off the conveyor belt 226 and are fed into the front end 242 of the fourth conveyor assembly 218 (see FIG. 8*a*). As the casing 240 and screw member 260 rotates, the wood chips 50 and cutting debris are urged to move toward the rear end 234 of the tubular casing 240. In the fourth conveyor assembly 218, wood chips of a desired size are separated from the cutting debris which is smaller than the desired size. That cutting debris is discharged from the fourth conveyor assembly through the apertures in the casing 240. The wood chips 50 of a desired size are then discharged through the cutout 270 and onto the chute 274 which directs them into the hopper 276 mounted atop the baling apparatus 220.

As the wood chips 50 in the hopper 276 and pass through the gap G defined between the counter-rotating rollers 282 and 284, they are ground or broken into still smaller, and more uniform pieces by the grinding assembly 280 (see FIGS. 8*a* and 9). The ground wood chips 50 are then gravity fed into the compaction chamber 366 wherein they are acted upon by the first and second chain and slat conveyor assemblies 324 and 326 of the baling mechanism 322. As the drive chains 322 travel over the guide rollers 334, the slats 364 grip the wood chips 50, compacting them as they rotate to form the core of the bale 52 (see FIG. 9). When the core has reached the desired size, the bale 52 is wrapped. Thereafter, the door panel 312 at the rear of the bale forming apparatus 86 moves to its open position 314 (shown in FIG. 10) to allow the bale 52 to be ejected from the compaction chamber 366. When a sufficient number of bales 52 have been formed, a vehicle such as a flat bed vehicle (not shown) may be dispatched to the field for collection of the bales 52. The bales 52 could then be stacked with the aid of lifting machinery (for example, a fork lift) onto the flat bed of the vehicle for transport to a storage facility or other facility for immediate use. Alternatively, a farm tractor outfitted with a bale clamping device could be used.

In the embodiment shown in FIGS. 2 to 10, the wood chips 50 conveyed to the bale forming apparatus 86 enter the interior chamber 320 of the housing 290 through an aperture in the top panel 300. While this is the preferred manner for delivering the wood chips 50 into the bale forming apparatus 86, it should be appreciated that the wood chips need not be fed into the bale forming apparatus from the top most location thereon. In alternative embodiments, the wood chips could be fed into the bale forming apparatus from a different location intermediate the top and bottom panels of the housing. One such embodiment is now described.

Referring to FIGS. 11 to 14, there is shown an alternative brush cutting and bale forming apparatus designated generally with reference numeral 370. The apparatus 370 is generally similar to apparatus 80 in that it too includes a skid steer 372, a brush cutter 374 mounted to the front end of the skid steer 372, a bale forming apparatus 378 hitched to the rear end of the skid steer 372 and a plurality of conveyor assemblies for transporting the wood chips 50 from the brush cutter 374 to the bale forming apparatus 378. The brush cutter 374 and the bale forming apparatus 378 are coupled to the skid steer 372 in the same manner described above in the context skid steer 84, the brush cutter 94 and the bale forming apparatus 80. The brush cutter 374 has a brush cutting head 379 is generally similar to the brush cutter 94 shown in FIGS. 2 to 4, such that no further description is required.

In like fashion to the apparatus 80, the apparatus 370 employs first, second, third and fourth conveyor assemblies 380, 382, 384 and 386, respectively. The first and second conveyor assemblies 382 and 384 resemble in all material respects (e.g. structure, configuration, placement and functionality) those first and second conveyor assemblies 142 and 166 shown in FIG. 4. Accordingly, the description of the assemblies 142 and 166 applies equally to the assemblies 382 and 384 for the purposes of describing this embodiment of the invention.

The third conveyor assembly 384 is not unlike the third conveyor assembly 210 shown in FIG. 4. The assembly 384 has a lower end 390 attached to the front body portion 392 of the skid steer 372, and upper end 394 supported on the fourth conveyor assembly 386. In like fashion to the third conveyor assembly 210, the assembly 384 extends on an incline relative to a horizontal reference plane parallel to the ground (see FIG. 12). However, in this embodiment, the angle of incline $\theta_3$ of the assembly 384 is steeper than the angle of incline of assembly 166. It measures 31 degrees relative to the horizontal reference plane. When viewed from the top (as shown in FIG. 13), the assembly 384 is oriented generally parallel to the second conveyor assembly 382 but is inwardly offset relative thereto. Additionally, the lower end 390 of the assembly 384 occupies a position that is in front of, and beneath, the upper end 396 of the second conveyor assembly 382.

In this embodiment, the third conveyor assembly 384 is a belt conveyor assembly 400 generally similar to belt conveyor assembly 220. The assembly 400 includes a drive pulley (hidden from view) disposed at the lower end 390 of the assembly 384, an idler (also hidden from view) disposed at the upper end 394 of the assembly 384, a conveyor belt 402 extending between the drive pulley and idler and a motor (not shown) for driving rotation of the drive pulley. The conveyor belt 402 possesses partition elements 404 which tend to facilitate vertical transport of the wood chips 50 along the third conveyor assembly 384. In this embodiment, the conveyor belt 402 has a length of $L_5$ (as measured between the centers of the drive pulley and the idler), which is somewhat shorter than the length $L_3$ of the conveyor belt 200. The length $L_5$ measures 109.5 inches. In other embodiments, the length of the conveyor belt 402 could be adjusted to suit a different configuration of conveyor assemblies.

In like fashion to belt conveyor assembly 210, the assembly 384 is also provided with a frame 406 not unlike frame 230. The conveyor belt 402, the drive pulley and the idler are supported by and connected to the frame 406, in much the same manner as conveyor belt 226, drive pulley 222 and idler 224 in respect of frame 230.

Despite the different inclination and length of the third conveyor assembly 384, it functions very much like assembly 210, with the drive pulley being driven to rotate counterclockwise to cause the conveyor belt 402 to travel upwardly towards the rear of the apparatus 370.

Figure 12:
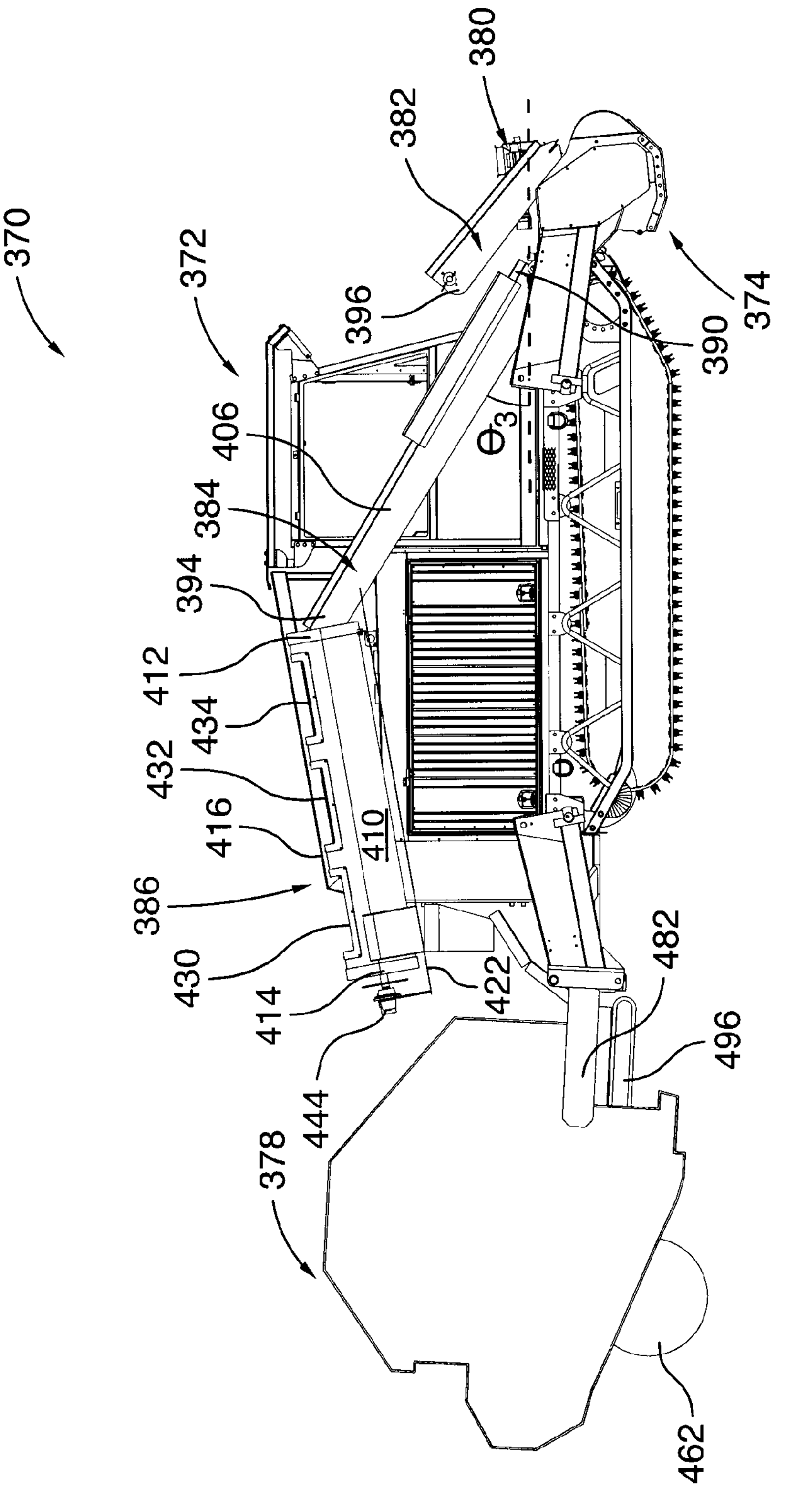
FIG. 12 is a side elevation view of the brush cutting and wood chip baling apparatus of FIG. 11.
Figure 13:
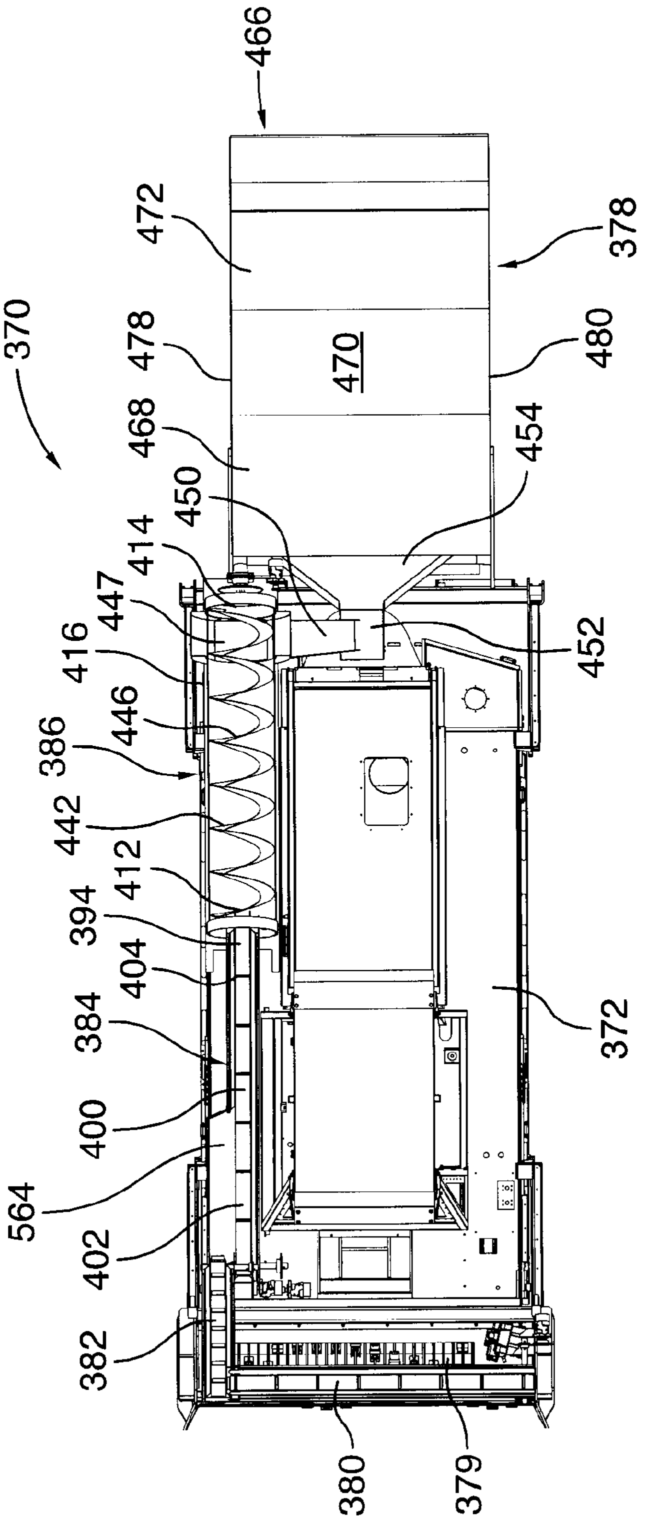
FIG. 13 is a top plan view of the brush cutting and wood chip baling apparatus of FIG. 11 with the cover panel of the brush cutter housing removed to reveal details of the first conveyor assembly and the upper body portion of the fourth conveyor assembly removed to reveal details of the screw conveyor assembly.

Referring now to FIGS. 12 and 13, the fourth conveyor assembly 386 resembles the fourth conveyor assembly 218 of apparatus 80 in most respects. More specifically, like assembly 218, the assembly 386 has a generally tubular body or casing 410 provided with a front end 412 and a rear end 414, and a screw member 416 housed with the casing 410.

However, in this embodiment, the casing 410 does not extend horizontally but rather is inclined downwardly towards the rear of the apparatus 370, such that its front end 412 is carried higher above the ground than its rear end 414. In this embodiment, the angle of inclination $\theta_4$ of the casing 410 measures 10 degrees relative to a horizontal reference plane parallel to the ground. The longitudinal axis of the casing 410 is substantially aligned with that of the third belt conveyor assembly 384 such that wood chips 50 carried by assembly 384 can be easily fed into the fourth conveyor assembly 386. The casing 410 is supported for rotation at either end thereof on a frame 420 made up substantially of a support plate 422. The support plate 422 is mounted to the upper portion of the skid steer 372. Disposed along the upper portion of the casing 410 are three spaced apart transparent panels 430, 432 and 434 provided to allow the operator to peer into the interior space of the casing 410 to view the screw member 416. The casing 410 is apertured much like a screen such that as the wood chips and cutting debris travel through the fourth conveyor assembly, the wood chips that are larger than the apertures in the casing 410 are retained within the fourth conveyor assembly 386, while those particles that are smaller than the apertures are discharged from the casing 410.

The screw member 416 is structurally similar to the screw member 246. It too has a screw member 440 in the form of a shaftless spiral 442 whose outer edges are fixed to the inner surface of the casing 410 so that the casing 410 and shaftless spiral 440 can be made to rotate as a single unit. Operatively connected to the rear end of the shaftless spiral 442, is a (preferably, hydraulic) motor 444 for driving rotation of the screw member 440 and casing 410. As explained above, the shaftless spiral in the fourth conveyor assembly could be replaced with an auger member and/or the screw member could be made freely rotatable within the casing.

In operation, as the casing 410 and spiral 442 are driven to rotate, the blade portions 446 of the spiral 442 carry wood chips 50 rearward toward an arcuate cutout 447 defined in the lower portion of the casing 410 adjacent the rear end 414 of the fourth conveyor assembly. The cutout communicates with an aperture (not visible) in the support plate 422 which itself opens on to a first relatively long, narrow chute 450 positioned directly beneath the aperture. The first chute 450 is oriented substantially perpendicular to the longitudinal axis of the fourth conveyor assembly 386. Disposed at the bottom of the first chute 450 in an orientation transverse thereof, is a relatively short second chute 452. The second chute 452 opens onto a third fan-shaped chute 454 which extends toward a lower region of the housing 460 of apparatus 378.

Figure 14:
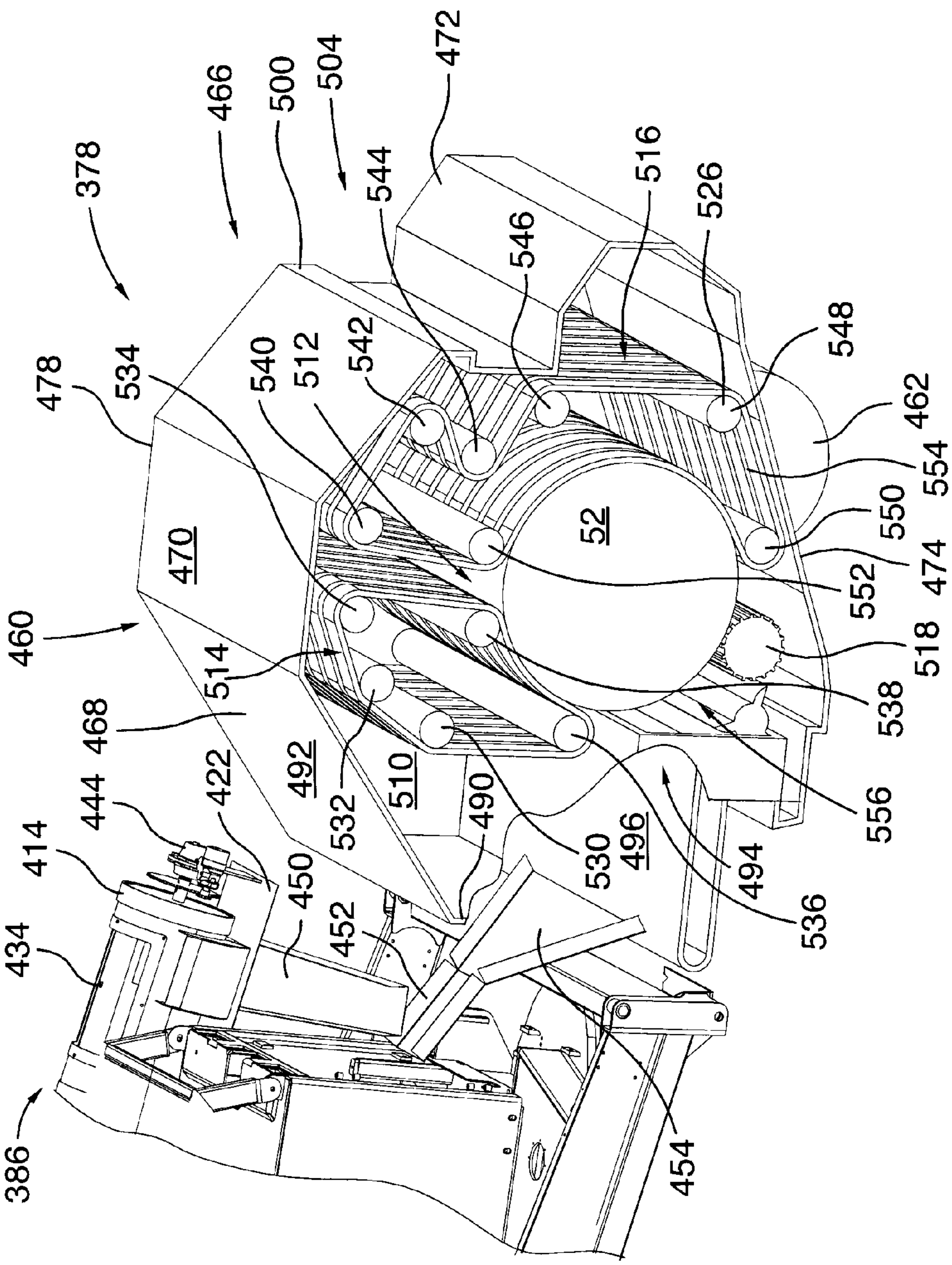
FIG. 14 is a rear perspective view of the brush cutting and wood chip baling apparatus of FIG. 11 with the sidewall and a portion of the front panel removed to reveal details of the baling mechanism of the bale forming apparatus.
Figure 15:
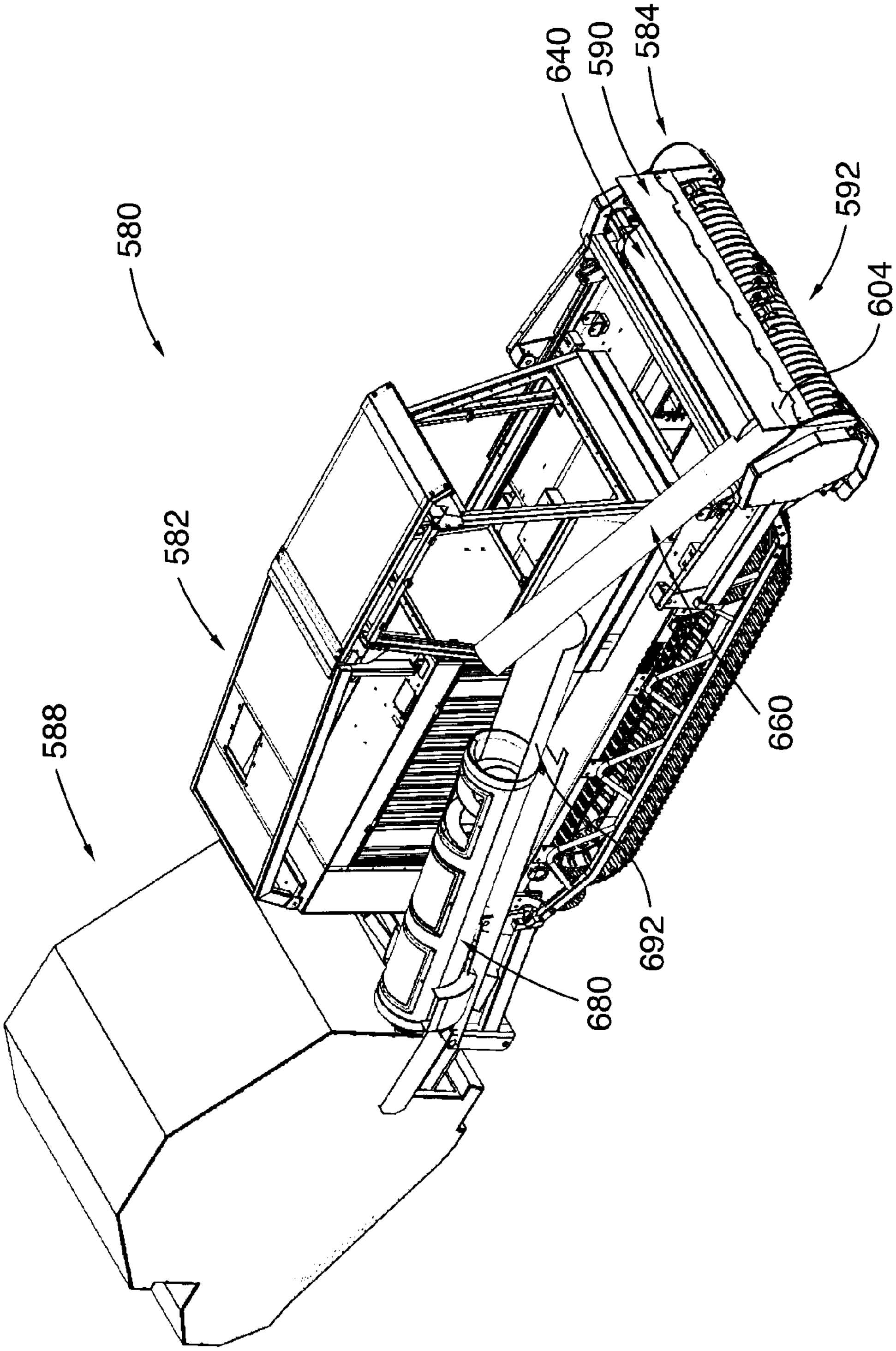
FIG. 15 is a perspective view of a brush cutting and wood chip baling apparatus according to yet another embodiment of the present invention.
Figure 16:
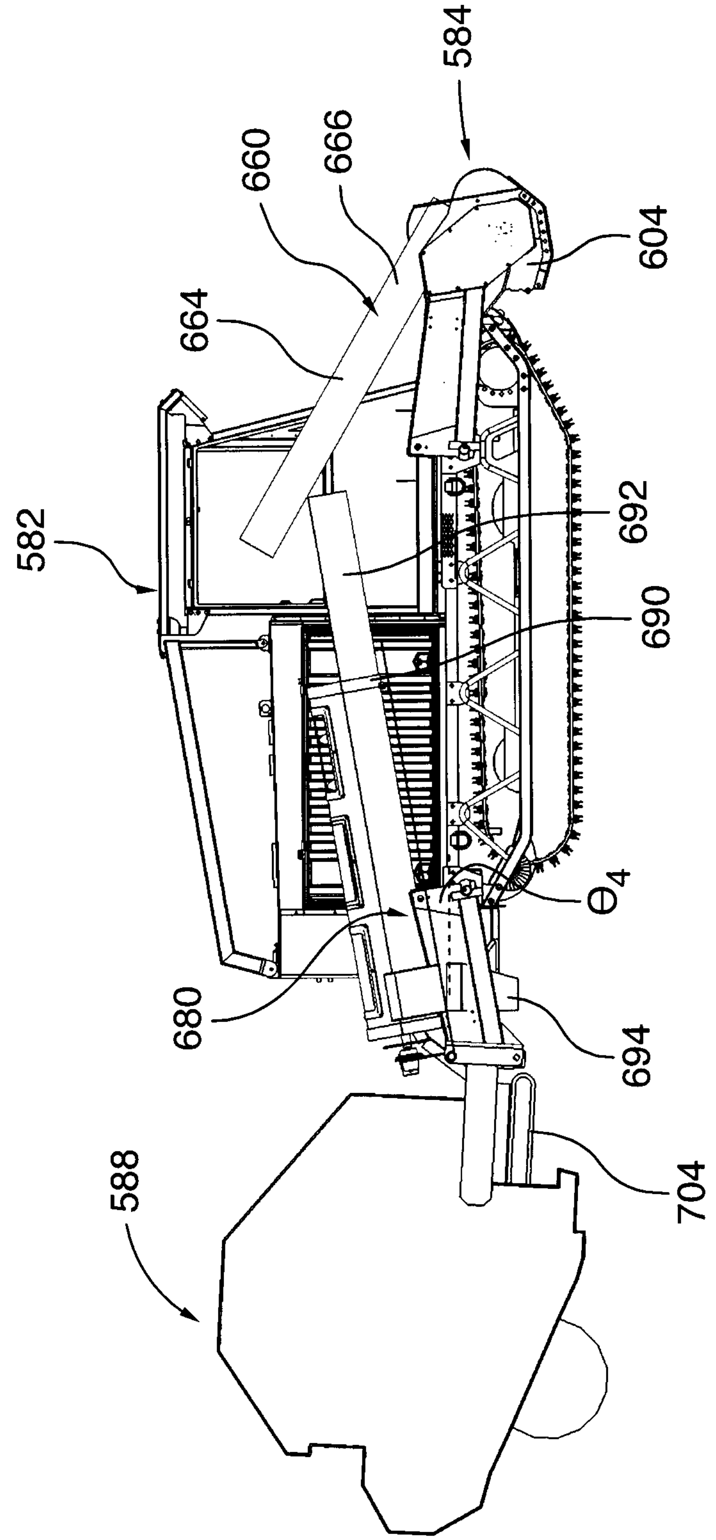
FIG. 16 is a side elevation view of the brush cutting and wood chip baling apparatus of FIG. 15.
Figure 17:
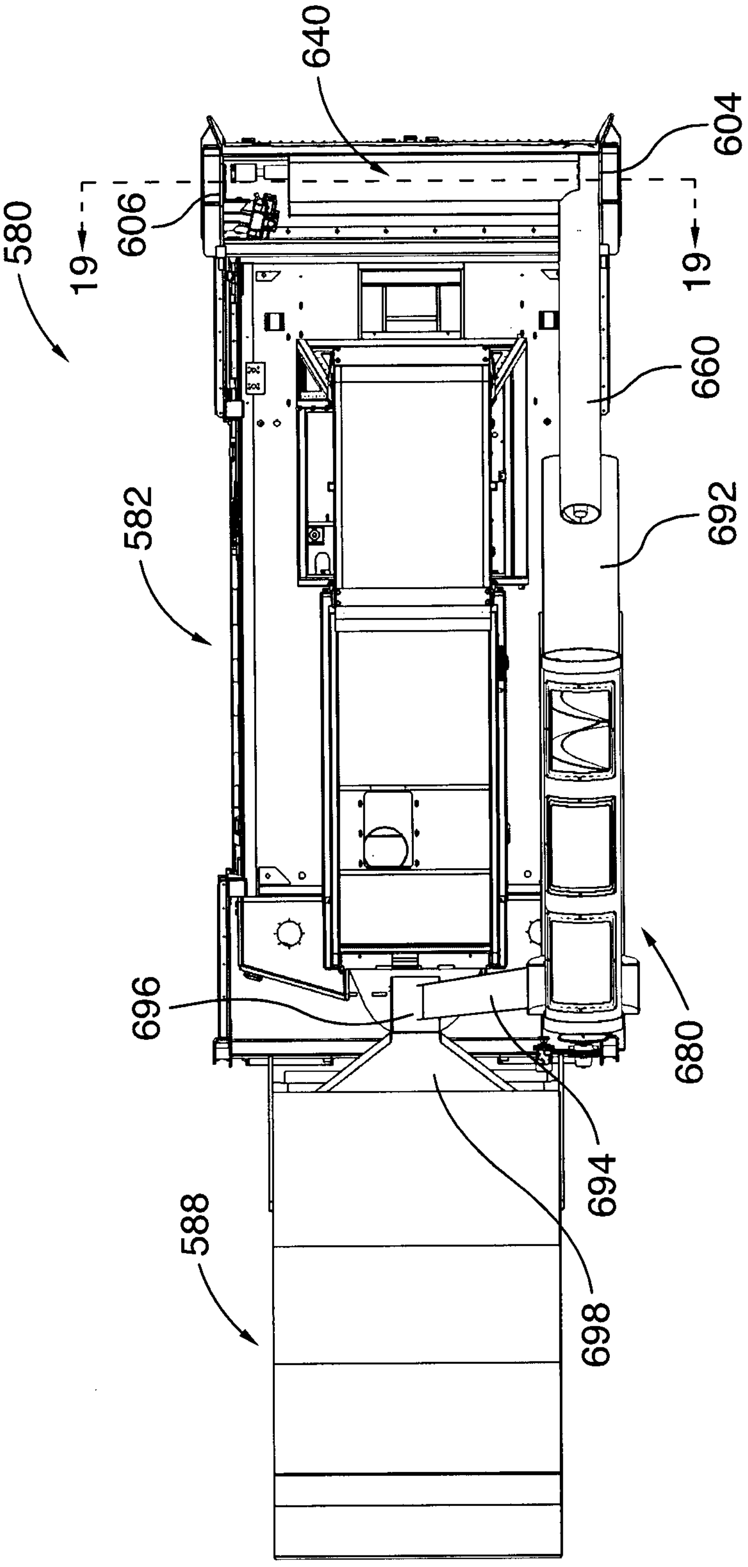
FIG. 17 is a top plan view of the brush cutting and wood chip baling apparatus of FIG. 15.

With reference to FIG. 14, the bale forming apparatus 378 is now described in greater detail. The bale forming apparatus 378 has a housing 460 generally similar to housing 290 of the bale forming apparatus 86. The housing 460 is supported on wheels 462 for rolling motion on the ground and includes a front end 464 and an opposed rear end 466, and is defined by a front panel 468, a top panel 470, a rear panel 472, a bottom panel 474, a pair of sidewalls 478 and 480 extending between the front and rear ends 464 and 466. A pair of towing arms 482 is provided to connect the bale forming apparatus 478 to the coupling arms 484 of the skid steer 372.

The front panel 468 has a first vertically-extending panel portion 490 and a second inclined panel portion 492. Provided in the housing 460 below the lowermost extremity of the first panel portion 490, is an opening 494 which communicates with an interior chamber 510 of the housing 460. The opening 494 is sized to accommodate a conveyor assembly 496 protruding forwardly therethrough. The second panel portion 492 joins the uppermost extremity of the first panel portion 490 and extends upwardly and rearward thereof to meet the top panel 470. The top panel 470 extends horizontally a short distance until it joins to the rear panel 472.

The rear panel 472, which spans between the top panel 470 and the bottom 474, has a generally irregular profile. In like fashion to housing 290, in housing 460 a portion of the rear panel 472 defines a movable door panel 500 hingedly connected to the top panel 470. The door panel 500 is movable between an open position (not shown, but similar to what is shown in FIG. 10) which permits a formed bale to be released from within the bale forming apparatus 378 and a closed position 504.

Defined between the front and rear panels 468 and 472, the top and bottom panels 470 and 474, and the sidewalls 478 and 480 is the interior chamber 510 of the housing 460. A baling mechanism 512 is disposed within the interior chamber 510. The baling mechanism 512 is of the type generally known in the art such that only a high-level description is required for the purposes of illustrating the principles of the invention as applied to this embodiment. Shown conceptually in FIG. 14, the baling mechanism 512 includes first and second conveyor assemblies 514 and 516 and a rotatable, toothed shaft 518 extending between the sidewalls 478 and 480. The first and second conveyor assemblies 514 and 516 are generally similar to the counterpart assemblies 324 and 326 shown in FIG. 9 in that each conveyor assembly 514, 516 also has a pair of endless drive chains 524 configured for continued rotation and a plurality of guide rollers 526 having drive sprockets (not shown) engageable with the drive chains 524. In the case of each conveyor assembly 514, 516, one drive chain 524 of the pair is positioned adjacent the side wall 468 of the housing 460 (not visible in the drawings) while the other drive chain 524 of the pair is positioned adjacent the opposite sidewall 480.

In each conveyor assembly 514, 516, some of the guide rollers 526 are fixed and others are movable. In the first conveyor assembly 514, the plurality of guide rollers 526 includes five guide rollers—first, second, third fourth and fifth guide rollers 530, 532, 534, 536 and 538, respectively. In this embodiment, the first, second, third and fourth guide rollers 530, 532, 534 and 536 are fixed while the fifth guide roller 538 is movable relative to the others. In the second conveyor assembly 516 seven guide rollers are used—first, second, third, fourth, fifth, sixth and seventh 540, 542, 544, 546, 548, 550 and 552 guide rollers. In present embodiment, the third and seventh guide roller 544 and 552 are movable while the remaining guide rollers 540, 542, 546, 548 and 550 are stationary. Hydraulic pistons (not shown) are used to move the movable guide rollers 538, 544 and 552. In alternative embodiments, a different number of guide rollers (fixed and/or movable) could be used for either or both of the conveyor assemblies 514 and 516.

However, in contrast to the conveyor assemblies 324 and 326, the conveyor assemblies 514 and 516 do not have transversely extending, spaced apart slats. Instead, the conveyor assemblies 514 and 516 are provided with a plurality of belts or bands 554 configured for engagement by the guide rollers 526. The spacing between the belts 554 is selected to ensure that wood chips of a desired size are maintained within the compaction chamber 556 defined in the variable-sized space bounded by the first and second conveyor assemblies 514 and 516.

The baling mechanism 512 is also provided with an assembly (not shown) for wrapping the outer surface of the bale 52 with twine, net wrap or the like to thereby protect the bale from the elements.

In operation, the wood chips 50 discharged onto the conveyor assembly 496 are transported into the interior chamber 510 of the housing 460 and acted upon by the toothed shaft 518 and the belts 554 as the drive chains 524 travel over the guide rollers 526. In this case the gripping action of the belts 554 pulls the wood chips 50 into the compaction chamber 556 and applies pressure to the wood chips 50 as they are rotated within the compaction chamber 556. The compaction of the wood chips 50 during rotation, results in the creation of a bale core which grows as more wood chips 50 are fed into the compaction chamber 556. The movable guide rollers 538, 544 and 552 allow the arrangement of the drive chains 524 and belts 554 to be reconfigured so as to adjust to shape of the increasingly large core. When the core has reached the desired size, the bale 52 is wrapped and then released from the compaction chamber 556 and exits the bale forming apparatus 378 through the opening 558 formed by moving the door panel 500 to its open position.

While in this embodiment, the apparatus 370 uses a bale forming apparatus whose baling mechanism employs belts, it should be appreciated that in other embodiments, the baling mechanism of such bale forming apparatus could use slats instead. The same applies for the apparatus 80; its bale forming apparatus could be configured with belts instead of slats and used to similar advantage.

Use of the brush cutting and wood chip baling apparatus 370 is similar to that of apparatus 80 described above. The operator of the apparatus 370 drives the skid steer 372 over a patch of land to be cleared and actuates the brush cutter 374. The brush cutting head 374 is urged to rotate along its rotational axis "R-R" causing the cutting teeth 178 carried on the support body 170 to make cutting contact with brush and small trees. The cutting action of the teeth 178 shreds the brush reducing it to wood chips 50 and other cutting debris. The rotational movement of the brush cutting head 374 simultaneously (or almost simultaneously) causes the wood chips 50 to be taken up into the housing of the brush cutter 374 and deposited onto the first conveyor assembly 380, as described above in the context of apparatus 80.

The wood chips 50 are carried by the first conveyor assembly 380 toward the second conveyor assembly 382. At the end 560 of the first conveyor assembly 380, the wood chips 50 are gravity fed onto to the second conveyor assembly 382. The assembly 382 carries the wood chips 50 up to the rear end 532 thereof, at which point the wood chips 50 are discharged onto a chute 564 which directs the wood chips 50 toward the third conveyor assembly 384. The wood chips 50 in the chute 564 fall onto the discharge onto the conveyor belt 402 and are transported upwardly and rearward toward the fourth conveyor assembly 386.

At the upper end 394 of the third conveyor assembly 384, the wood chips 50 drop off the conveyor belt 402 and are fed into the front end 412 of the fourth conveyor assembly 386. As the screw member 440 rotates, the wood chips 50 are urged to move toward the rear end 414 of the tubular casing 410. In the fourth conveyor assembly 386, wood chips of a desired size are separated from the cutting debris which is smaller than the desired size. That cutting debris is discharged from the fourth conveyor assembly 386 through the apertures in the casing 410. The wood chips 50 of a desired size are discharged through the arcuate cutout defined in the lower portion 448 of the casing 410 and travel along the first, second and third chutes 450, 452 and 454 to ultimately, arrive at the conveyor assembly 496 which feeds the wood chips 50 into the compaction chamber 556.

Once in the compaction chamber 556, the wood chips 50 are acted upon by the first and second conveyor assemblies 514 and 516 of the baling mechanism 522. As the drive chains 524 travel over the guide rollers 526, the belts 554 grip the wood chips 50 compacting them as they rotate to form the core of the bale 52. When the core has reached the desired size, the bale 52 is wrapped. Thereafter, the door panel 500 at the rear of the bale forming apparatus 378 moves to its open position 502 to allow the bale 52 to be ejected from the compaction chamber 556.

In each of the embodiments shown in FIGS. 4 and 13, four conveyor assemblies are used to carry the wood chips generated by the brush cutting head to the wood chip bale forming apparatus. This need not be the case in every application. With the appropriate modifications, it may be possible to combine one or more of these conveyor assemblies to thereby reduce the number of conveyor assemblies employed. In a first alternative embodiment, a single conveyor assembly could be configured to transport wood chips from the first conveyor assembly to the grinding assembly (if one is provided) or directly to the bale forming apparatus. In such an embodiment, the functionality of the second, third and fourth conveyor assemblies would be combined into a single modified conveyor assembly. In a second alternative embodiment, the functionality of the second and third conveyor assemblies could be combined into a single modified conveyor assembly. In such an embodiment, the single modified conveyor assembly would be operable to transport wood chips from the first conveyor assembly to the grinding assembly (if one is provided) or directly to the wood chip bale forming apparatus. Additionally, other changes may be made to the conveyor assemblies. For instance, in certain applications, the belt conveyor assemblies used by the apparatuses 80 and 370 could be replaced with screw conveyor assemblies.

Referring to FIGS. 15 to 20, there is shown another alternative brush cutting and wood chip baling apparatus generally designated with reference numeral 580. The apparatus 580 is generally similar to apparatus 370 in that it too includes a skid steer 582, a brush cutter 584 mounted to the front end of the skid steer 582, a bale forming apparatus 588 hitched to the rear end of the skid steer 582 and a plurality of conveyor assemblies for transporting the wood chips 50 from the brush cutter 584 to the bale forming apparatus 588. In contrast to the apparatus 370 which employs four conveyor assemblies, the apparatus 580 employs only three—first, second and third conveyor assemblies 640, 660 and 680, respectively.

The brush cutter 584 and the bale forming apparatus 588 are coupled to the skid steer 582 in the same manner described above in the context skid steer 372, the brush cutter 379 and the bale forming apparatus 378. The brush cutter 584 includes an open-bottom housing 590 and a brush cutting head 592 rotatably mounted within the housing 590.

Figure 18:
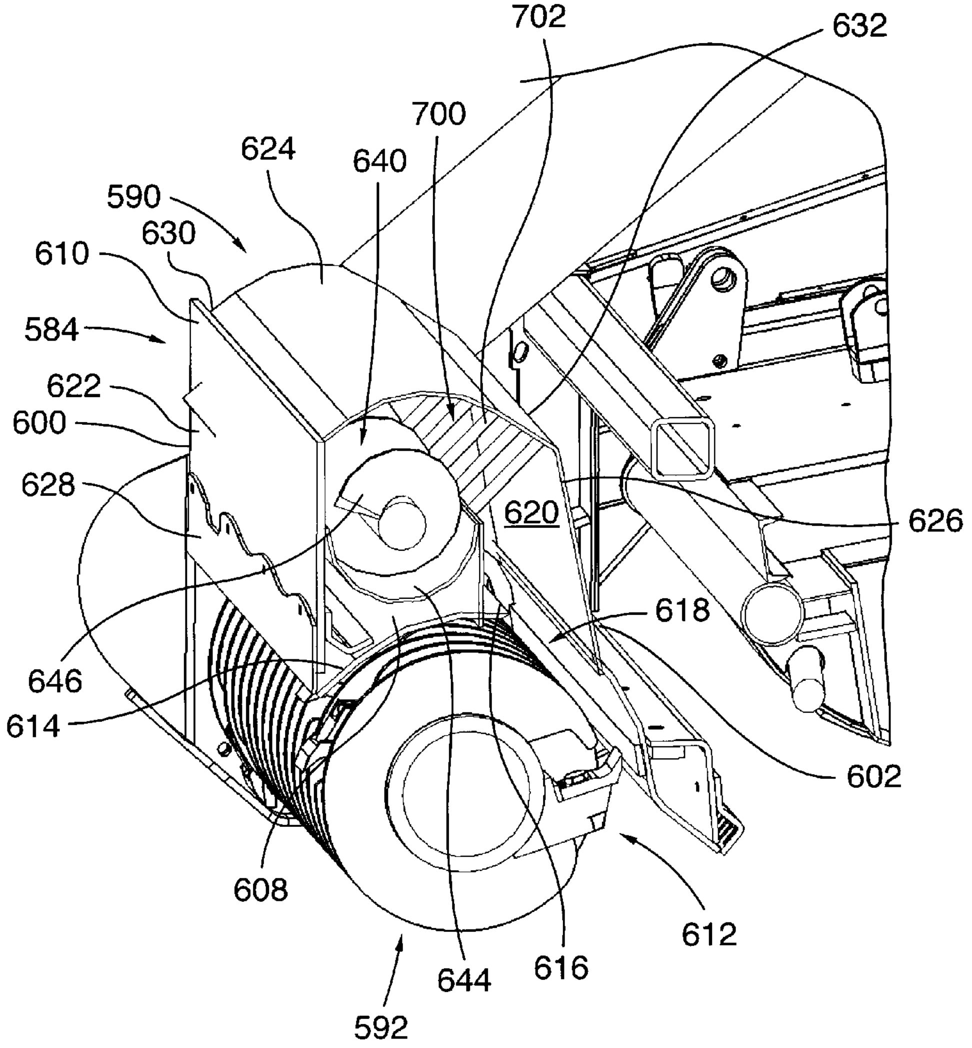
FIG. 18 is a partial cross-sectional, perspective view of the brush cutting and wood chip baling apparatus of FIG. 19 taken along line "18-18" showing the interior of the brush cutter.
Figure 19:
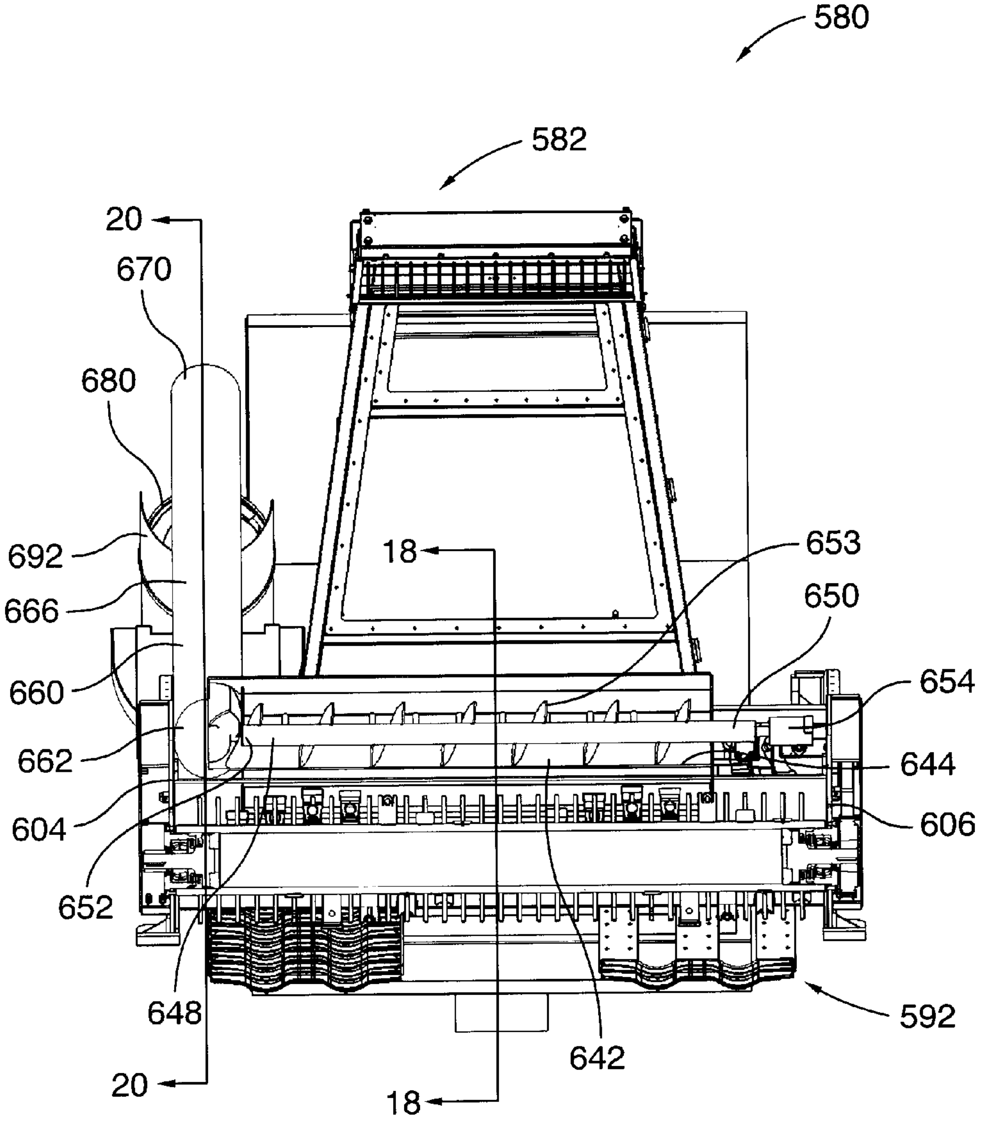
FIG. 19 is cross-sectional view of the brush cutting and wood chip baling apparatus of FIG. 17 taken along line "19-19" to reveal details of the first conveyor assembly.

Referring to FIGS. 18 and 19, the housing 590 has a front end 600 and a rear end 602 and is defined generally by a pair of first and second side panels 604 and 606, a curved wall 608 extending longitudinally between and joined to the side panels 604 and 606, and a cover panel 610 disposed above the curved wall 608. The curved wall 608 runs between the front and rear ends 602 and 604 of the housing 590 and is carried roughly midway between the upper and lower ends of the side panels 604 and 606. The curved profile of the wall 608 partially defines a well 612 which is sized to accommodate the brush cutting head 592. The wall 608 is provided with a large cutout 618 disposed between the front and rear margins 614 and 616 of the wall 608. The cutout 618 spans nearly the entire length of wall 608. As will be explained in greater below, the cutout 618 defines a passageway between the well 612 and an interior space 620 of the housing 590 to allow wood chips 50 from within the well 612 to travel into the interior space 620.

In this embodiment, the cover panel 610 is made from steel. It includes a first relatively wide straight portion 622, a second curved portion 624 and a third relatively wide straight portion 626. An angle member 628 fixedly connects the first straight portion 622 to the front margin 614 of the wall 608. The first straight portion 622 extends upwardly from the well 612 and joins with the second curved portion 624 along the front margin 630 thereof. The second curved portion 624 has a slightly convex shape. The third portion 626 extends downwardly from the rear margin 632 of the second curved portion 624 until it meets a portion of the curved wall 608.

Supported on the curved wall 608 is the first conveyor assembly 640. Contrary to the first conveyor assemblies of apparatuses 80 and 370 which were belt conveyor assemblies, in this embodiment, the first conveyor assembly 640 is a screw conveyor assembly 642. The assembly 642 includes a generally concave trough member 644 fastened to the curved wall 608 and a rotatable auger member 646 configured to fit within the trough member 644. As best shown in FIG. 19, the auger member 646 includes a shaft 648 having first and second ends 650 and 652, and helically extending blade portions 653 extending between the first and second ends 650 and 652. The shaft 648 extends transversely of the longitudinal axis of the apparatus 580, with its first end 650 lying beyond the cover panel 610 and operatively connected to a motor 654 for driving rotation thereof. In the opposite direction, the second end 652 of the shaft 648 is disposed shy of the second conveyor assembly 660. In this embodiment, the auger member 646 has a diameter of 9 inches, a pitch of 10 inches and a length of 65.75 inches.

In operation, the auger member 646 moves wood chips 50 introduced into the first conveyor assembly 640 along the trough member 644 toward the second conveyor assembly 660 disposed adjacent the first side panel 604. In an alternative embodiment, the auger member could be replaced with a shaftless spiral.

The brush cutting head 592 is generally similar to brush cutting head 98 in all material respects (e.g. structure, configuration and functionality) and accordingly requires no further description. In like fashion to the brush cutting head 98, the brush cutting head 592 performs a take up function, that is, it takes up (or picks up) the wood chips and other cutting debris from the ground and urges them toward the interior space 620 in the housing 590.

Referring now to FIGS. 16, 17, 18 and 20, the second conveyor assembly 660 is now described in greater detail. The second conveyor assembly 660 is carried on the housing 590 with its lower end 662 supported on the outer surface of the curved wall 608 and intersecting with the cover panel 610. In this embodiment, the assembly 608 is oriented generally perpendicular to the first conveyor assembly 640, but is positioned on an incline (the angle $\theta_5$ of which measures 39 degrees relative to a horizontal reference plane parallel to the ground).

In this orientation, the lower end 662 of the assembly 660 meets with one end of first conveyor assembly 640. In an alternative embodiment, a different angle of incline for the assembly 660 could be employed.

Figure 20:
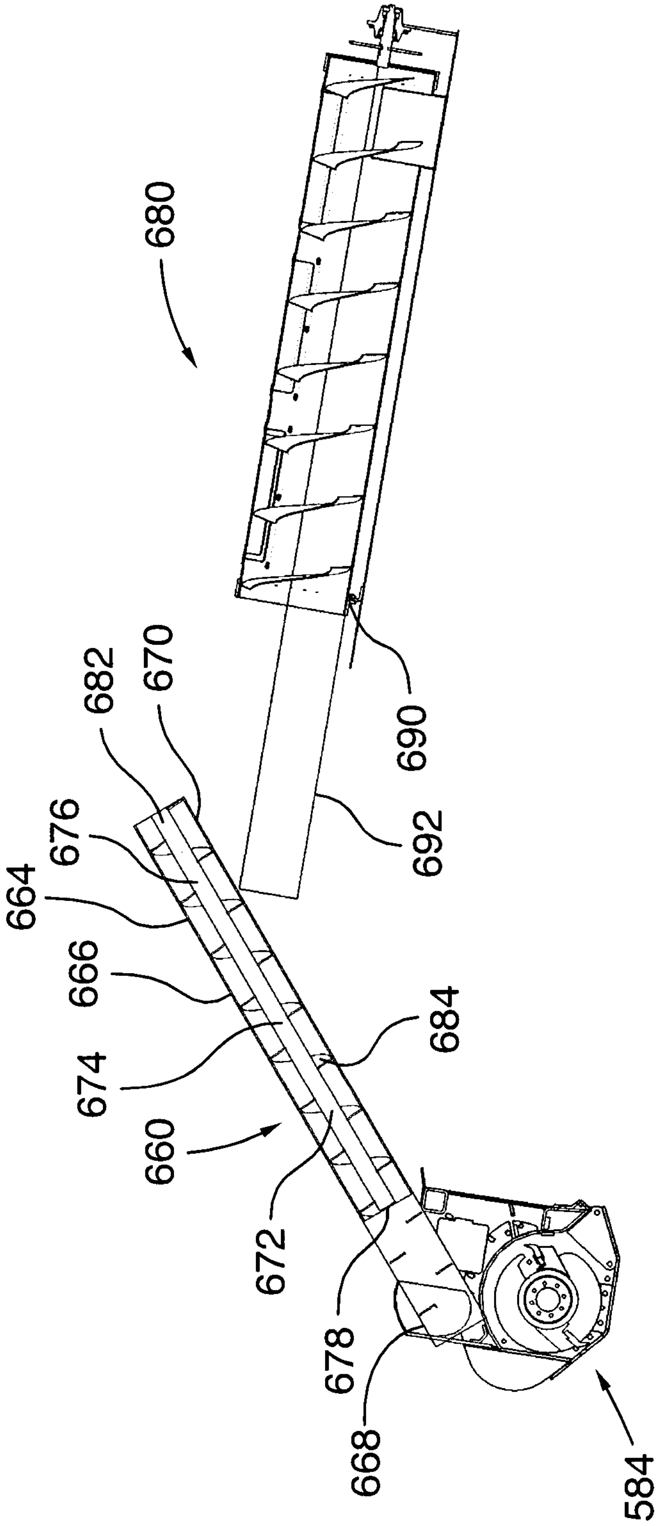
FIG. 20 is another cross-sectional view of the brush cutting and wood chip baling apparatus of FIG. 19 taken along line "20-20" showing details of the second and third conveyor assemblies with the skid steer removed for enhanced clarity.

In contrast to the second conveyor assembly 382 of the apparatus 370, the second conveyor assembly 660 is not a belt conveyor assembly. Instead the assembly 660 takes the form of a screw conveyor assembly 664. It includes a generally tubular body or casing 666 provided with front and rear ends 668 and 670, and a screw member 672 housed with the casing 666 and extending between the front and rear ends 668 and 670. In this embodiment, the screw member 672 is an auger member 674 configured for rotation within the casing 666. As best shown in FIG. 20, the auger member 674 includes a shaft 676 having first and second ends 678 and 682, and helically extending blade portions 684 extending between the first and second ends 678 and 682. A motor (not shown) is operatively connected to the first end 678 for driving rotation of the shaft 676. In this embodiment, the auger member 674 has a diameter of 9 inches, a pitch of 10 inches and a length of 76.5 inches.

In operation, as the auger member 674 is driven to rotate within the casing 666, its blade portions 684 carry wood chips 50 upwardly and rearward toward the rear end 670 of the casing 666.

The third conveyor assembly 680 resembles in all material respects (e.g. structure, configuration, placement and functionality) the fourth conveyor assembly 386; except that it has projecting from its front end 690 an elongate chute member 692 which carried forwardly of and directly below the rear end 670 of the second conveyor assembly 660. The chute member 692 is adapted to receive wood chips 50 from the second conveyor assembly 660 and to direct them into fourth conveyor assembly 386. Moreover, the path of the wood chips 50 from the third conveyor assembly 680 to the bale forming apparatus assembly 588 is similar to that of the wood chips 50 discharged from the fourth conveyor assembly 386 of apparatus 370. More specifically, the apparatus 580 is provided with first, second and third chutes 694, 696 and 698 that are similar in structure, configuration and placement to chutes 450, 452 and 454.

In this embodiment, the bale forming apparatus 588 is similar in all material respects to the bale forming apparatus 378 such that no additional description is required.

Use of the brush cutting and wood chip baling apparatus 580 is similar to that of apparatus 370 described above. The operator of the apparatus 580 drives the skid steer 582 over a patch of land to be cleared and actuates the brush cutter 584 thereby generating wood chips and other cutting debris. The rotational movement of the brush cutting head 592 simultaneously (or almost simultaneously) causes the wood chips 50 to be taken up into the well 612 and into the interior space 620 of the housing 590. The wood chips 50 are propelled through the cutout 618 defined in the curved wall 608 and travel upwardly in the space defined between the trough member 644 and the third portion 626 of the cover panel 610.

To prevent relatively large rocks or other cutting debris from entering the first conveyor assembly 640 and possibly damaging the assembly 640, a grate member 700 made up of a series of spaced apart slats or bars 702 extending diagonally between the trough member 644 and the cover panel 610, is provided (see FIG. 18). Wood chips 50 sized smaller than the spacing between the bars 702, are permitted to pass through into the first conveyor assembly 640. Once introduced in the first conveyor assembly 640, the wood chips 50 are transported by the blade portions 653 of the auger member 646 during rotation thereof. The wood chips 50 reach the end of the trough member 644 and fall onto the second conveyor assembly 660 whereat the auger member 674 carries the wood chips upwardly and rearward toward the third conveyor assembly 680.

At the rear end 670 of the second conveyor assembly casing 666, the wood chips 50 drop onto the chute member 692 which feeds them into the front end of third conveyor assembly 680. The wood chips 50 within the third conveyor assembly 680 are urged to exit the assembly 680 through the rear end thereof. The wood chips 50 then travel along the first, second and third chutes 694, 696 and 698 to ultimately, arrive at the conveyor assembly 704 which feeds the wood chips 50 into the bale forming apparatus 588. Once in the bale forming apparatus 588, compaction and baling of the wood chips 50 takes place as described above in the context of bale forming apparatus 378.

Figure 21:
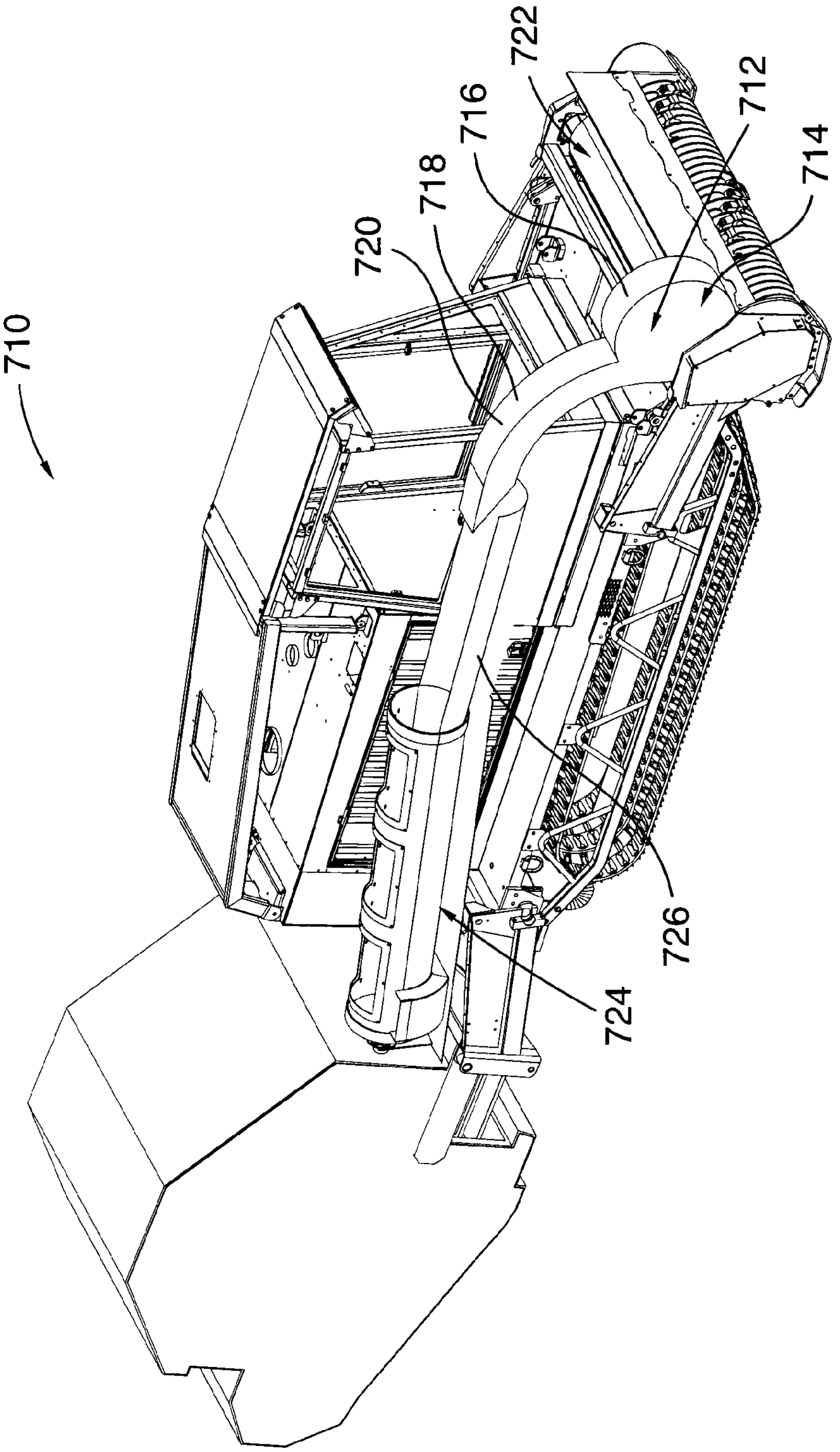
FIG. 21 is a perspective view of a brush cutting and wood chip baling apparatus according to another alternative embodiment of the present invention.

While in the embodiments described above each of the apparatuses 80, 370 and 580 used either a belt conveyor or a screw conveyor for its second conveyor assembly, the application of the principles of this invention are not limited to these types of conveyors only. In an alternative embodiment, it may be possible to replace the belt conveyors and screw conveyors employed above in favour of different material conveyors. For instance, FIG. 21 shows an alternative brush cutting and baling apparatus 710 which is outfitted with a blower 712 as its second conveyor assembly 714. The blower 712 has a hollow body 716 which houses an arrangement of vane elements (not shown) which may be rotatively driven by a motor (not shown). The hollow body 716 has an elongate, relatively narrow neck portion 718 which defines the discharge chute 720 of the blower 712. The apparatus 710 is in all other material respects the same as apparatus 580, except that its first conveyor assembly 722 now communicates with the interior of the hollow body 716 so as to allow wood chips 50 from the first conveyor assembly 722 to be taken up by the arrangement of vane elements within the blower 712. As well, the third conveyor assembly 724 is provided with a longer chute 726 at its front end to receive wood chips from the discharge chute 720 of the blower 712.

In the embodiments described above the bale forming apparatuses 86, 378 and 588 are configured to form round bales of wood chips. It should be appreciated that the application of the principles of the present invention is not limited to the formation of round bales. In other embodiments, square or differently shaped bales may be formed. In such cases, the bale forming apparatus would be adapted accordingly.

While baling wood chips immediately after cutting the brush is advantageous, it need not be performed in this manner every application. In certain field applications, it may be desirable to have a skid steer provided with a brush cutter at the front end thereof and a plurality of conveyor assemblies. However, instead of having the conveyor assemblies configured to transport the wood chips away from the brush cutting head of the brush cutter to a bale forming apparatus towed at the rear of the skid steer, it may be possible to configure the conveyor assemblies to discharge the wood chips into a waiting dump truck or other vehicle. The wood chips could then be transported to a central baling facility or to another facility for further processing.

Although the foregoing description and accompanying drawings relate to specific preferred embodiments of the present invention as presently contemplated by the inventor, it will be understood that various changes, modifications and adaptations, may be made without departing from the spirit of the invention.

What is claimed is:

1. A brush cutting and bale forming apparatus comprising:

a vehicle having front and rear ends;

a brush cutter carried at the front end of the vehicle, the brush cutter having a housing and a brush cutting head mounted for rotation within the housing, the brush cutting head having a support body and a plurality of cutting teeth mounted thereon, the cutting teeth being capable of reducing brush to wood chips and cutting debris when the brush cutting head is actuated, the brush cutting head being operable to take up at least some of the wood chips and cutting debris into the brush cutter housing while the cutting teeth are reducing brush to wood chips and cutting debris;

a bale forming apparatus coupled for towage to the rear end of the vehicle, the bale forming apparatus being operable to form bales of wood chips; and a plurality of conveyor assemblies carried on the brush cutting and bale forming apparatus for transporting the wood chips taken up by the brush cutting head to the bale forming apparatus;

the housing having an interior space defined therein; and a portion of the housing defining a well for receiving the brush cutting head; the well having first and second ends and being in communication with the interior space of the housing to permit the travel of wood chi from the well into the interior space of the housing;

the plurality of conveyor assemblies includes a first conveyor assembly disposed within the interior space of the housing above the brush cutting head and forwardly of the rearmost extremity of the brush cutting head; the first conveyor assembly extending generally parallel to the well assembly and being operable to transport wood chips from the first end of the well toward the second end thereof.

2. The brush cutting and bale forming apparatus of claim 1 wherein:

the housing includes first and second spaced apart side panels, a curved wall extending longitudinally between the first and second side panels and joined thereto and an elongate cover panel placed over the curved wall in spaced relation thereto;

the curved wall corresponds substantially to the portion of the housing defining the well;

the interior space is defined between the curved wall and the cover panel; and the curved wall has an elongate opening defined therein, the elongate opening forming a passage between the well and the interior space through which wood chips may travel.

3. The brush cutting and bale forming apparatus of claim 1 wherein the first conveyor assembly is selected from the group consisting of a belt conveyor assembly and a screw conveyor assembly.

4. The brush cutting and bale forming apparatus of claim 1 wherein the plurality of conveyor assemblies includes a second conveyor assembly disposed transverse of the first conveyor assembly and adjacent the second end of the well, the second conveyor assembly being configured to receive wood chips from the first conveyor assembly and to carry the wood chips rearward toward the bale forming apparatus.

5. The brush cutting and bale forming apparatus of claim 4 wherein:

- the first conveyor assembly has a first end and a second discharge end;
- each of the first and second conveyor assemblies is a belt conveyor assembly; and
- a portion of the second conveyor assembly is located directly beneath the discharge end of the first conveyor assembly so as to allow wood chips from the first conveyor assembly to be deposited onto the second conveyor assembly.

6. The brush cutting and bale forming apparatus of claim 4 wherein:

- the first conveyor assembly has a first end and a second discharge end; and
- the discharge end of the first conveyor assembly is operatively connected to the second conveyor assembly to allow wood chips from the first conveyor assembly to be introduced into the second conveyor assembly.

7. The brush cutting and bale forming apparatus of claim 6 wherein each of the first and second conveyor assemblies is a screw conveyor assembly.

8. The brush cutting and bale forming apparatus of claim 6 wherein the first conveyor assembly is a screw conveyor assembly and the second conveyor assembly is a blower.

9. The brush cutting and bale forming apparatus of claim 4 wherein the second conveyor assembly has front and rear ends, and the rear end of the second conveyor assembly is carried higher off the ground than the front end thereof.

10. The brush cutting and bale forming apparatus of claim 4 wherein the second conveyor assembly is selected from the group consisting of: (a) a belt conveyor assembly; (b) a screw conveyor assembly; and (c) a blower.

11. The brush cutting and bale forming apparatus of claim 4 wherein the plurality of conveyor assemblies includes a third conveyor assembly disposed rearward of the second conveyor assembly, the third conveyor assembly being configured to receive wood chips from the second conveyor assembly and to carry the wood chips rearward toward the bale forming apparatus.

12. The brush cutting and bale forming apparatus of claim 11 wherein:

- the second conveyor assembly has a first end and a second discharge end;
- the brush cutting and bale forming apparatus further includes a chute positioned beneath the discharge end of the second conveyor assembly to receive wood chips therefrom; and
- the chute is connected to the third conveyor assembly and is capable of directing wood chips received from the discharge end of the second conveyor assembly to the third conveyor assembly.

13. The brush cutting and bale forming apparatus of claim 11 wherein each of the second and third conveyor assemblies is a belt conveyor assembly.

14. The brush cutting and bale forming apparatus of claim 11 wherein each of the second and third conveyor assemblies is a screw conveyor assembly.

15. The brush cutting and bale forming apparatus of claim 11 wherein the second conveyor assembly is a blower and the third conveyor assembly is a screw conveyor assembly.

16. The brush cutting and bale forming apparatus of claim 11 wherein the third conveyor assembly has front and rear ends and the rear end of the third conveyor assembly is carried higher off the ground than the front end thereof.

17. The brush cutting and bale forming apparatus of claim 11 wherein the third conveyor assembly has front and rear ends and the front end of the third conveyor assembly is carried higher off the ground than the rear end thereof.

18. The brush cutting and bale forming apparatus of claim 11 wherein the plurality of conveyor assemblies includes a fourth conveyor assembly disposed rearward of the third conveyor assembly, the fourth conveyor assembly being configured to receive wood chips from the third conveyor assembly and to carry the wood chips rearward toward the bale forming apparatus.

19. The brush cutting and bale forming apparatus of claim 18 wherein the fourth conveyor assembly is a screw conveyor assembly.

20. The brush cutting and bale forming apparatus of claim 18 wherein the fourth conveyor assembly is supported on the vehicle.

21. The brush cutting and bale forming apparatus of claim 18 wherein:

- the bale forming apparatus has a housing and the fourth conveyor assembly is supported on the housing of the bale forming apparatus.

22. The brush cutting and bale forming apparatus of claim 18 wherein the fourth conveyor assembly has front and rear ends which are carried at the same height above the ground.

23. The brush cutting and bale forming apparatus of claim 18 wherein the fourth conveyor assembly has front and rear ends and the front end of the fourth conveyor assembly is carried higher off the ground than the rear end thereof.

24. The brush cutting and bale forming apparatus of claim 18 wherein:

- the brush cutting and bale forming apparatus further includes a grinding assembly for grinding the wood chips prior to their being introduced into the bale forming apparatus;
- the grinding assembly being positioned to receive wood chips from the fourth conveyor assembly and to discharge ground wood chips into the bale forming apparatus.

25. The brush cutting and bale forming apparatus of claim 1 wherein:

- the bale forming apparatus has a housing defined by a front panel, a rear panel, a top panel, a bottom panel and a pair of sidewalls extending between the front and rear panels and between the top and bottom panels; and
- the top panel has an aperture through which the wood chips may be introduced into the bale forming apparatus.

26. The brush cutting and bale forming apparatus of claim 1 wherein:

- the bale forming apparatus has a housing defined by a front panel, a rear panel, a top panel, a bottom panel and a pair of sidewalls extending between the front and rear panels and between the top and bottom panels; and
- the front panel has an aperture through which the wood chips may be introduced into the bale forming apparatus.

27. The brush cutting and bale forming apparatus of claim 1 wherein:

the bale forming apparatus has a housing defined by a front panel, a rear panel, a top panel, a bottom panel and a pair of sidewalls extending between the front and rear panels and between the top and bottom panels, a compaction chamber contained within the housing and baling mechanism disposed within the compaction chamber; and the baling mechanism includes a plurality of chain and slat conveyor assemblies operable to act upon the wood chips to form a bale.

28. The brush cutting and bale forming apparatus of claim 1 wherein:

the bale forming apparatus has a housing defined by a front panel, a rear panel, a top panel, a bottom panel and a pair of sidewalls extending between the front and rear panels and between the top and bottom panels, a compaction chamber contained within the housing and baling mechanism disposed within the compaction chamber; and the baling mechanism includes a plurality of chain and belt conveyor assemblies operable to act upon the wood chips to form a bale.

29. The brush cutting and bale forming apparatus of claim 1 further comprising a grinding assembly for grinding the wood chips prior to their being introduced into the bale forming apparatus.

* * * * *